(12) United States Patent
Cha et al.

(10) Patent No.: US 12,516,463 B2
(45) Date of Patent: Jan. 6, 2026

(54) WASHING MACHINE AND CONTROL METHOD THEREFOR

(71) Applicant: Samsung Electronics Co., Ltd., Suwon-si (KR)

(72) Inventors: Jaehoon Cha, Suwon-si (KR); Suho Jo, Suwon-si (KR); Jonghun Ha, Suwon-si (KR); Sukbae Kim, Suwon-si (KR); Changhyun Park, Suwon-si (KR); Hyoungjin Lee, Suwon-si (KR); Kyounghwan Kim, Suwon-si (KR); Hwasung Kim, Suwon-si (KR); Jeongil Oh, Suwon-si (KR); Odo Ryu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1231 days.

(21) Appl. No.: 16/966,190

(22) PCT Filed: Feb. 1, 2019

(86) PCT No.: PCT/KR2019/001419
§ 371 (c)(1),
(2) Date: Jul. 30, 2020

(87) PCT Pub. No.: WO2019/164155
PCT Pub. Date: Aug. 29, 2019

(65) Prior Publication Data
US 2021/0040668 A1    Feb. 11, 2021

(30) Foreign Application Priority Data

Feb. 23, 2018  (KR) .................. 10-2018-0022245
Feb. 26, 2018  (KR) .................. 10-2018-0023182
Jan. 8, 2019   (KR) .................. 10-2019-0002327

(51) Int. Cl.
*D06F 34/30*     (2020.01)
*D06F 34/08*     (2020.01)
(Continued)

(52) U.S. Cl.
CPC .............. *D06F 34/30* (2020.02); *D06F 34/08* (2020.02); *G06F 1/3203* (2013.01); *G10L 15/08* (2013.01);
(Continued)

(58) Field of Classification Search
CPC ... G10L 15/08; G10L 15/22; G10L 2015/088; G10L 2015/223; D06F 34/30;
(Continued)

(56) References Cited

U.S. PATENT DOCUMENTS 7,310,603 B2 * 12/2007 Park ...................... G05D 1/0033
                                                        15/300.1
8,434,180 B2 *  5/2013 Lee .......................... D06F 33/36
                                                            8/159
(Continued)

FOREIGN PATENT DOCUMENTS

CN    101649537 A  *  2/2010
CN    104007809 A     8/2014
(Continued)

OTHER PUBLICATIONS

G Azam, M T Islam, "Design and Fabrication of a Voice Controlled Wheelchair for Physically Disabled People", Aug. 2015, ResearchGate, pp. 81-90 (Year: 2015).*
(Continued)

*Primary Examiner* — Paras D Shah
*Assistant Examiner* — Nadira Sultana
(74) *Attorney, Agent, or Firm* — Jefferson IP Law, LLP

(57) ABSTRACT

Disclosed is a washing machine. The present washing machine comprises: a voice inputter; and a processor,
(Continued)

wherein the processor is configured to: when a user voice is input via the voice inputter in a power saving mode of the washing machine, switch the washing machine to a standby mode on the basis of wake-up words included in the user voice; maintain the standby mode of the washing machine or switch the washing machine to an operation mode on the basis of control words included in the user voice; and execute operations corresponding to the control words in the standby mode or operation mode.

14 Claims, 16 Drawing Sheets

(51) Int. Cl.
    *G06F 1/3203*     (2019.01)
    *G10L 15/08*     (2006.01)
    *G10L 15/22*     (2006.01)
    *D06F 101/20*     (2020.01)
    *D06F 105/50*     (2020.01)

(52) U.S. Cl.
    CPC .......... *G10L 15/22* (2013.01); *D06F 2101/20* (2020.02); *D06F 2105/50* (2020.02); *G10L 2015/088* (2013.01); *G10L 2015/223* (2013.01)

(58) Field of Classification Search
    CPC .. D06F 34/08; D06F 2105/50; D06F 2101/20; G06F 1/3203
    See application file for complete search history.

(56) References Cited

U.S. PATENT DOCUMENTS

| | | | |
|---|---|---|---|
| 8,787,395 B2* | 7/2014 | Dangy-Caye | H04L 12/66 370/401 |
| 9,300,898 B2* | 3/2016 | Jang | H04N 21/42203 |
| 9,329,676 B2 | 5/2016 | Shao et al. | |
| 9,562,311 B2 | 2/2017 | Cho | |
| 9,747,899 B2 | 8/2017 | Pogue et al. | |
| 9,830,907 B2* | 11/2017 | Ryu | H04N 5/63 |
| 9,915,020 B2* | 3/2018 | Yang | G05B 15/02 |
| 10,287,723 B2* | 5/2019 | James | D06F 34/32 |
| 10,468,023 B2 | 11/2019 | Ryu et al. | |
| 10,711,381 B2 | 7/2020 | Li et al. | |
| 10,720,155 B2 | 7/2020 | Pogue et al. | |
| 10,753,029 B2 | 8/2020 | Shu et al. | |
| 10,934,653 B2* | 3/2021 | Choi | D06F 31/00 |
| 11,568,867 B2 | 1/2023 | Pogue et al. | |
| 11,600,271 B2 | 3/2023 | Pogue et al. | |
| 11,636,861 B2 | 4/2023 | Kim et al. | |
| 11,674,253 B2 | 6/2023 | Shu et al. | |
| 2005/0206244 A1* | 9/2005 | Son | G06F 1/30 307/140 |
| 2014/0149118 A1* | 5/2014 | Lee | G10L 15/22 704/251 |
| 2014/0222436 A1* | 8/2014 | Binder | G06F 1/1694 704/275 |
| 2014/0244272 A1 | 8/2014 | Shao et al. | |
| 2015/0006176 A1* | 1/2015 | Pogue | G10L 15/22 704/249 |
| 2015/0135777 A1 | 5/2015 | Cho | |
| 2015/0179176 A1 | 6/2015 | Ryu et al. | |
| 2016/0104480 A1* | 4/2016 | Sharifi | G10L 15/32 704/254 |
| 2017/0061784 A1* | 3/2017 | Clough | G06F 3/04842 |
| 2017/0116987 A1* | 4/2017 | Kang | G10L 15/26 |
| 2017/0169817 A1* | 6/2017 | VanBlon | G10L 15/02 |
| 2017/0256255 A1* | 9/2017 | Bocklet | G10L 15/22 |
| 2017/0330568 A1 | 11/2017 | Ryu et al. | |
| 2017/0342624 A1 | 11/2017 | Lv et al. | |
| 2018/0044834 A1* | 2/2018 | Shu | D06F 34/18 |
| 2018/0057987 A1 | 3/2018 | Li et al. | |
| 2018/0130468 A1 | 5/2018 | Pogue et al. | |
| 2019/0032265 A1 | 1/2019 | Choi | |
| 2019/0035398 A1 | 1/2019 | Choi et al. | |
| 2019/0355365 A1* | 11/2019 | Kim | G06F 1/3209 |
| 2020/0354874 A1 | 11/2020 | Shu et al. | |
| 2021/0005197 A1 | 1/2021 | Pogue et al. | |
| 2021/0005198 A1 | 1/2021 | Pogue et al. | |

FOREIGN PATENT DOCUMENTS

| | | | | |
|---|---|---|---|---|
| CN | 104652080 A | 5/2015 | | |
| CN | 105734890 A | 7/2016 | | |
| CN | 106032625 A | 10/2016 | | |
| DE | 3910763 A1 | 10/1990 | | |
| EP | 0 283 795 A2 | 9/1988 | | |
| JP | 11-202892 A | 7/1999 | | |
| JP | 2016-524193 A | 8/2016 | | |
| KR | 960014256 B1 * | 10/1996 | ............ | G10L 15/22 |
| KR | 10-2004-0050766 A | 6/2004 | | |
| KR | 10-2011-0137614 A | 12/2011 | | |
| KR | 10-2014-0095779 A | 8/2014 | | |
| KR | 10-2015-0058885 A | 5/2015 | | |
| KR | 10-2015-0073441 A | 7/2015 | | |
| KR | 10-1556173 B1 | 9/2015 | | |
| KR | 10-2016-0068938 A | 6/2016 | | |
| KR | 10-1754686 B1 | 7/2017 | | |
| KR | 10-2017-0090648 A | 8/2017 | | |
| KR | 10-2017-0093629 A | 8/2017 | | |
| KR | 10-2017-0122774 A | 11/2017 | | |
| KR | 10-2017-0124588 A | 11/2017 | | |
| KR | 10-2017-0134317 A | 12/2017 | | |
| KR | 20170134317 A * | 12/2017 | | |
| KR | 10-2018-0083587 A | 7/2018 | | |

OTHER PUBLICATIONS

Korean Office Action dated Jun. 7, 2023, issued in Korean Application No. 10-2019-0002327.
Extended European Search Report dated Dec. 16, 2020, issued in European Patent Application No. 19757165.6-1016.
European Examination Report dated Jan. 16, 2023, issued in European Application No. 19757165.6.
Chinese Office Action dated Sep. 2, 2022, issued in Chinese Patent Application No. 201980014401.3.
Korean Office Action dated Dec. 26, 2023, issued in Korean Application No. 10-2019-0002327.
Korean Notice of Allowance dated Apr. 9, 2024, issued in Korean Application No. 10-2019-0002327.

* cited by examiner

FIG. 6

605

"BIXBY, PLEASE SET THE LOWER WASHING MACHINE TO {STANDARD WASHING} COURSE."

"YES, I SET THE LOWER WASHING MACHINE TO {STANDARD WASHING} COURSE."

610

"BIXBY, PLEASE SET THE LOWER WASHING MACHINE TO {60 DEGREES}"

"YES, I SET THE WATER TEMPERATURE OF THE LOWER WASHING MACHINE TO {60 DEGREES}."

620

"BIXBY, I WANT TO DO {RINSING} {ONCE} MORE TO THE {STANDARD COURSE} OF THE LOWER WASHING MACHINE."

"YES, I DID {RINSING} {ONCE} MORE TO THE {STANDARD COURSE} OF THE LOWER WASHING MACHINE."

630

"BIXBY, PLEASE SET THE LOWER WASHING MACHINE TO {TUB DRYING} {20 MINUTES}."

"YES, I SET {TUB DRYING} {20 MINUTES} TO THE LOWER WASHING MACHINE."

FIG. 7

"BIXBY, PLEASE {TURN OFF} AN ALARM OF THE LOWER WASHING MACHINE."

"YES, I WILL TURN OFF THE WASHING END ALARM."

"BIXBY, PLEASE {TURN ON} THE LIGHT OF THE LOWER WASHING MACHINE."

"YES, I TURNED ON THE DRUM LIGHT."

"BIXBY, PLEASE LET ME KNOW A CURRENT STATE OF THE WASHING MACHINE."

"THE UPPER MACHINE IS SET TO COMPACT WASH, FULL-AUTOMATIC, STANDARD WASHING COURSE, COOL TEMPERATURE WATER, RINSING NUMBER ON. THE LOWER MACHINE IS SET TO BLANKET COURSE, TEMPERATURE OF 40 DEGREES, 4 TIMES OF RINSING, DEHYDRATION INTENSITY MEDIUM, DRYING ADDITION STANDARD."

"BIXBY, PLEASE LET ME KNOW REMAINING WASHING TIME."

"ABOUT 1 HOUR AND 47 MINUTES LEFT."

FIG. 8

"BIXBY, I NEED TO WASH {BLUE JEANS} AND {TOWEL}."

I RECOMMEND STANDARD WASHING FOR <BLUE JEANS> AND <TOWEL>. CONTAMINATION MAY OCCUR IN THE <BLUE JEANS> SO SEPARATE WASHING IS RECOMMENDED. <TOWEL> IS RECOMMENDED TO USE SEPARATE WASHING AS IT MAY CAUSE DUST TO OTHER LAUNDRY. 

"BIXBY, WHAT IS {SMALL AMOUNT HIGH SPEED COURSE}?"

{SMALL AMOUNT HIGH SPEED COURSE} IS A COURSE USED WHEN YOU WISH TO WASH SOMEWHAT CLEAN AND SMALL AMOUNT OF CLOTHS RAPIDLY. PLEASE USE THIS COURSE FOR LAUNDRY LESS THAN OR EQUAL TO 5KG. 

"BIXBY, WHICH ERROR IS THIS?"

AN ERROR HAS BEEN FOUND TO A DRAINAGE MOTOR. I RECOMMEND YOU TO MAKE A SERVICE CENTER VISIT FOR REPAIRING. IF YOU WISH TO CONTACT THE SERVICE CENTER, PLEASE CALL 1588-3366. 

"BIXBY, THE DOOR IS NOT OPENED, EVEN THOUGH THE WASHING IS DONE."

IF THE INSIDE TEMPERATURE IS HIGH, A DOOR IS NOT OPENED TEMPORARILY. PLEASE WAIT FOR ABOUT ONE MINUTE SO THAT INSIDE TEMPERATURE GOES DOWN. 

"BIXBY, PLEASE START THE {STANDARD WASHING} COURSE AT THE LOWER WASHING MACHINE."

"YES, I TURNED THE POWER ON AND STARTED THE {STANDARD WASH} COURSE AT THE LOWER WASHING MACHINE."

910

"BIXBY, PLEASE SET THE WASHING MACHINE TO {TURBO WASHING} COURSE."

"YES, I WILL TURN THE POWER ON AND SET TO {TURBO WASHING} COURSE."

915

"BIXBY, PLEASE SET THE LOWER WASHING MACHINE TO {60 DEGREES} OF WATER AND {STANDARD WASHING} COURSE."

"YES, I SET THE WATER TEMPERATURE OF THE LOWER WASHING MACHINE TO {60 DEGREES} AND {STANDARD WASHING}."

920

"BIXBY, PLEASE ADD RINSING {THREE TIMES} TO {TURBO WASHING} COURSE OF THE WASHING MACHINE."

"YES, I SET THE LOWER WASHING MACHINE TO RINSING {THREE TIMES} TO {TURBO WASHING} COURSE."

FIG. 10

1005

"BIXBY, WHAT IS THIS NOISE?"

"THE DOOR OF THE LOWER WASHING MACHINE IS OPENED. PLEASE SHUT THE DOOR AND PRESS AN OPERATION BUTTON AGAIN."

1010

"BIXBY, THE DOOR OF THE WASHING MACHINE IS NOT OPENED."

"THE INSIDE TEMPERATURE OF THE WASHING MACHINE IS STILL HIGH AND YOU MAY NOT OPEN THE DOOR YET. PLEASE OPEN THE DOOR AFTER THE TEMPERATURE GOES DOWN FOR SAFETY."

1015

"BIXBY, I NEED TO WASH {BLUE JEANS} AND {TOWEL}."

"I RECOMMEND STANDARD WASHING. CONTAMINATION MAY OCCUR IN THE <BLUE JEANS> SO SEPARATE WASHING IS RECOMMENDED. <TOWEL> IS RECOMMENDED TO USE SEPARATE WASHING AS IT MAY CAUSE DUST TO OTHER LAUNDRY."

1020

"BIXBY, I NEED TO WASH {T-SHIRT} AND {MOUNTAIN CLOTH}."

"I RECOMMEND STANDARD WASHING FOR <T-SHIRT>. I RECOMMEND AN OUTDOOR COURSE FOR <MOUNTAIN CLOTH>."

FIG. 11
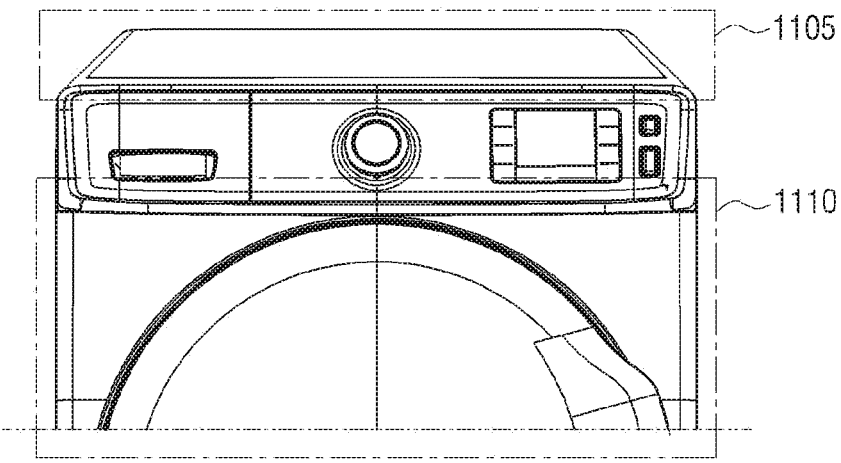
(a)
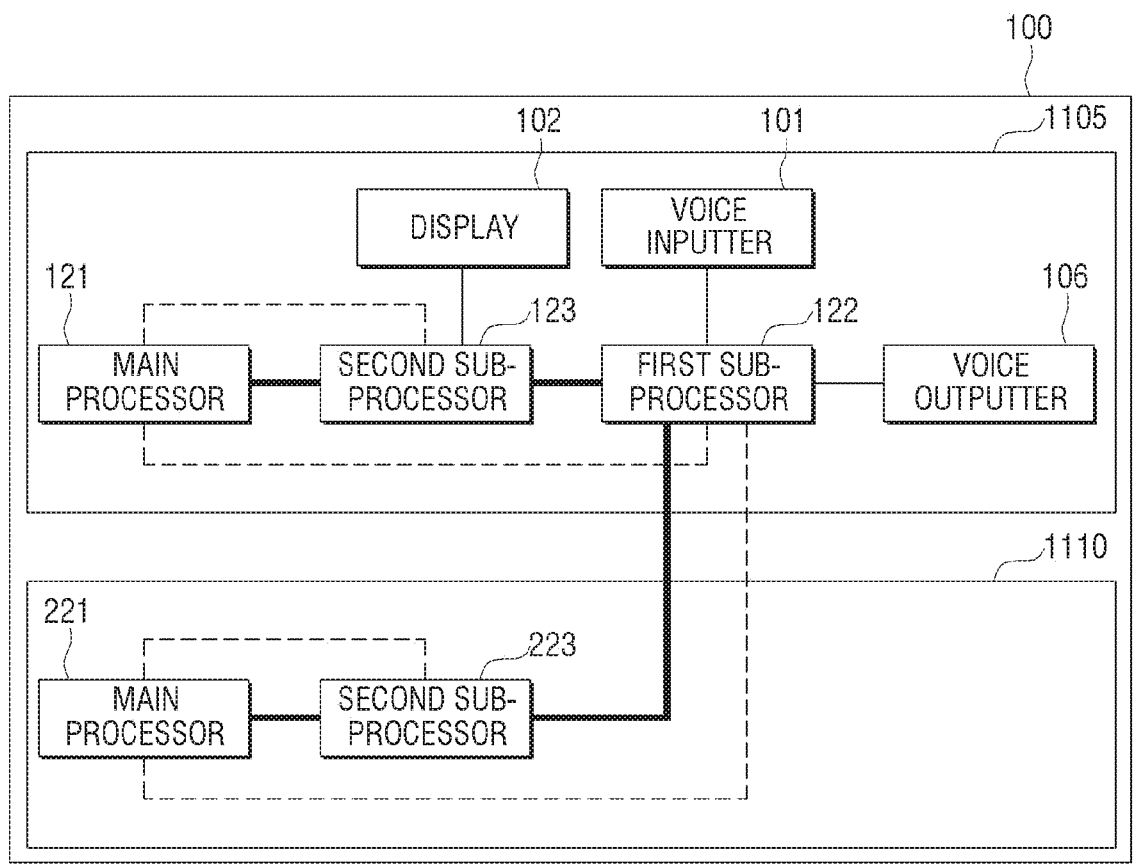
(b)

WASHING MACHINE AND CONTROL METHOD THEREFOR

TECHNICAL FIELD

This disclosure relates to a washing machine and a control method therefor and, more particularly, to a washing machine for controlling power using a plurality of processors and a control method therefor.

BACKGROUND ART

In order to operate a voice recognition function of a washing machine, a specific word is set as a wake-up word. If a wake-up word is included in a user voice, a washing machine is ready to execute a voice recognition function. In this disclosure, the wake-up word is Bixby.

The user utters a control command for the washing machine after the user has uttered the wake-up word. For example, if the user utters "Bixby, turn a washing machine on," the washing machine is ready to execute a voice recognition function by recognizing the wake-up word Bixby, and the power of the washing machine is turned on in response to a control command to turn the washing machine on.

If the washing machine is turned on, when the user utters, "Bixby, start washing with a standard course," a corresponding operation may be executed immediately.

If the washing machine is turned off, when the user utters, "Bixby, start washing with a standard course," there is a problem that the washing machine will not react to the utterance.

To be specific, the user had to utter twice such as "Bixby, turn the washing machine on," and then again "Bixby, start washing with a standard course" and thus, there is a problem in that user may feel inconvenient.

When it is determined that the user does not use the washing machine or when the user turns off the power of the washing machine, the washing machine may enter a power saving mode. In the power saving mode, most of the functions of the washing machine are not usable.

If a voice recognition module is added and all the elements enter a power saving mode, the user voice may not be recognized and thus, the voice recognition module needs to maintain a general operation state rather than a power saving mode. Accordingly, the disclosure is characterized by adding a voice recognition module to a general washing machine.

In order to recognize a user voice while the washing machine is in a power saving mode, the voice recognition module part must be in a state where the power saving mode is released. When the voice recognition module is added to the washing machine, there is a problem in that the power consumption of the washing machine is increased.

In the related art, in particular, a power saving mode is not used for a display part, and there is a problem in that power consumption is increased.

DISCLOSURE

Technical Problem

The disclosure is to address the above-described problems, and an object of the disclosure is to provide a washing machine which analyzes a user voice to divide a standby mode or an operation mode of the washing machine, and execute an operation corresponding to the user voice in each mode, and a control method therefor.

Technical Solution

According to an embodiment, a washing machine includes a voice inputter and a processor configured to, based on receiving a user voice through the voice inputter in a power saving mode of the washing machine, switch the washing machine to a standby mode based on a wake-up word included in the user voice, maintain the standby mode of the washing machine or switch the washing machine to an operation mode based on a control word included in the user voice, and execute an operation corresponding to the control word in the standby mode or the operation mode.

The processor may identify whether an operation corresponding to the control word is executable in the standby mode, and based on the operation being identified as executable in the standby mode, execute an operation corresponding to the control word in the standby mode, and based on the operation being identified as non-executable in the standby mode, switch the washing machine to the operation mode and execute an operation corresponding to the control word.

The processor may, based on the control word including at least one of a word associated with a state of the washing machine and a word associated with a washing process recommendation, identify an operation corresponding to the control word as being executable in the standby mode.

The power saving mode and the standby mode may be modes in which only a power button, among at least one button provided in the washing machine, is activated, and the operation mode may be a mode in which at least one button other than the power button is activated.

The processor may, based on a word associated with a washing process and a word associated with a detailed option of the washing process being included in the user voice, switch the standby mode to the operation mode, and proceed the washing process based on the detailed option.

The processor may include a main processor and a first sub-processor, and the first sub-processor may operate in a normal state in the power saving mode, execute voice recognition for the user voice, and transmit, to the main processor, a first control signal to switch the washing machine to the standby mode based on a wake-up word included in the user voice, and the main processor may, based on receiving the first control signal from the first sub-processor, switch the washing machine to the standby mode.

The main processor may operate with a power saving state in the power saving mode, and based on receiving the first control signal from the first sub-processor, switch the power saving state of the main processor to a normal state to switch the washing machine to a standby mode.

The processor may further include a second sub-processor configured to control a display and operate with a power saving state in the power saving mode, and the main processor may, based on receiving the first control signal from the first sub-processor, transmit, to the second sub-processor, a second control signal to switch the second sub-processor from the power saving state to a normal state.

The main processor and the second sub-processor may be connected via (or through) a first data communication line and a first power control line, the first sub-processor and the second sub-processor may be connected via (or through) a second data communication line, the main processor and the first sub-processor may be connected via (or through) a second power control line, and a control signal to switch the washing machine to a standby mode may be transmitted from the first sub-processor to the main processor via (or through) the second power control line.

The display may include a manipulation input panel, the second sub-processor, based on receiving the second control signal from the main processor, may switch to the normal state, and based on the washing machine switching to the operation mode, activate at least one button other than a power button included in the manipulation input panel.

The washing machine may include an upper washing machine and a lower washing machine, the first sub-processor may be included in at least one of the upper washing machine and the lower washing machine, and the second sub-processor and the main processor may be included in both of the upper washing machine and the lower washing machine, respectively.

The first sub-processor may identify whether an operation corresponding to a control word included in the user voice is executable in the standby mode, based on the operation identified as being executable in the standby mode, transmit a control signal to execute the operation corresponding to the control word to at least one of the second sub-processor or the main processor, and based on the operation identified as not being executable in the standby mode, transmit a control signal to switch the washing machine to the operation mode to at least one of the second sub-processor or the main processor.

The washing machine may include an upper washing machine and a lower washing machine, and the processor may identify at least one of the upper washing machine and the lower washing machine to execute the operation corresponding to the control word based on identification information of the washing machine included in the user voice.

The washing machine may include an upper washing machine and a lower washing machine, and the processor may, based on identification information of the washing machine not being included in the user voice, switch both of the upper washing machine and the lower washing machine to the standby mode or the operation mode, or switch the lower washing machine to the standby mode or the operation mode.

A control method of a washing machine according to an embodiment may include, based on receiving a user voice through a voice inputter in a power saving mode of a washing machine, switching to a standby mode of the washing machine based on a wake-up word included in the user voice, maintaining a standby mode of the washing machine or switching the washing machine to an operation mode based on a control word included in the user voice; and executing an operation corresponding to the control word in the standby mode or the operation mode.

The executing an operation corresponding to the control word may include identifying whether an operation corresponding to the control word is executable in the standby mode, and based on the operation being identified as executable in the standby mode, executing an operation corresponding to the control word in the standby mode, and based on the operation being identified as non-executable in the standby mode, switching the washing machine to the operation mode and executing an operation corresponding to the control word.

The executing an operation corresponding to the control word may include, based on the control word including at least one of a word associated with a state of the washing machine and a word associated with a washing process recommendation, identifying an operation corresponding to the control word as being executable in the standby mode.

The power saving mode and the standby mode may be modes in which only a power button, among at least one button provided in the washing machine, is activated, and the operation mode may be a mode in which at least one button other than the power button is activated.

The executing an operation corresponding to the control word may include, based on a word associated with a washing process and a word associated with a detailed option of the washing process being included in the user voice, switching the standby mode to the operation mode, and proceeding the washing process based on the detailed option.

A non-transitory computer readable medium storing a computer instruction to enable the washing machine to execute an operation when executed by the processor of the washing machine may include, based on receiving a user voice through a voice inputter in a power saving mode of a washing machine, switching to a standby mode of the washing machine based on a wake-up word included in the user voice, maintaining a standby mode of the washing machine or switching the washing machine to an operation mode based on a control word included in the user voice; and executing an operation corresponding to the control word in the standby mode or the operation mode.

DESCRIPTION OF DRAWINGS

FIG. 6 is a diagram illustrating a voice recognition function of a washing machine according to an embodiment;

FIG. 7 is a diagram illustrating a voice recognition function of a washing machine according to another embodiment;

FIG. 8 is a diagram illustrating a voice recognition function of a washing machine according to another embodiment;

FIG. 9 is a diagram illustrating a voice recognition function of a washing machine according to another embodiment;

FIG. 10 is a diagram illustrating a voice recognition function of a washing machine according to another embodiment;

FIG. 11(a)~(b) is a diagram illustrating a washing machine in which an upper washing machine and a lower washing machine are combined;

DETAILED DESCRIPTION OF EXEMPLARY EMBODIMENTS

Figure 1A:
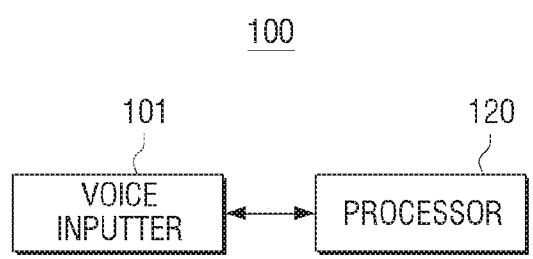
FIG. 1A is a block diagram illustrating a washing machine according to an embodiment.

Before specifically describing the disclosure, a method for demonstrating the present specification and drawings will be described.

Terms used in the present specification and the claims are general terms identified in consideration of the functions of the various embodiments of the disclosure. However, these terms may vary depending on intention, legal or technical interpretation, emergence of new technologies, and the like of those skilled in the related art. Also, there may be some terms arbitrarily identified by an applicant. Unless there is a specific definition of a term, the term may be construed based on the overall contents and technological common sense of those skilled in the related art.

Further, like reference numerals indicate like components that perform substantially the same functions throughout the specification. For convenience of descriptions and understanding, the same reference numerals or symbols are used and described in different embodiments. In other words, although elements having the same reference numerals are all illustrated in a plurality of drawings, the plurality of drawings do not mean one embodiment.

The terms such as "first," "second," and so on may be used to describe a variety of elements, but the elements should not be limited by these terms. The terms are used only for the purpose of distinguishing one element from another, and the meaning of the term should not be limited by the use of the ordinal number. For example, the elements associated with the ordinal numbers should not be limited in order or order of use by the numbers. If necessary, the ordinal numbers may be replaced with each other.

A singular expression includes a plural expression, unless otherwise specified. It is to be understood that the terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

These embodiments are capable of various modifications and have various embodiments, and specific embodiments are illustrated in the drawings and described in detail in the description. It should be understood, however, that it is not intended to limit the scope of the specific embodiments but includes all transformations, equivalents, and alternatives falling within the disclosed spirit and scope. When it is decided that a detailed description for the known art related to the disclosure may unnecessarily obscure the gist of the disclosure, the detailed description will be omitted.

The terms such as "first," "second," and so on may be used to describe a variety of elements, but the elements should not be limited by these terms. The terms are used only for the purpose of distinguishing one element from another.

The terms used herein are used for describing certain embodiments an are not intended to limit a scope of claims. A singular expression includes a plural expression, unless otherwise specified. It is to be understood that the terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

The term such as "module," "unit," "part", and so on is used to refer to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor.

Also, when any part is connected to another part, this includes a direct connection and an indirect connection through another medium. Further, when a certain portion includes a certain element, unless specified to the contrary, this means that another element may be additionally included, rather than precluding another element.

FIG. 1A is a block diagram illustrating a washing machine according to an embodiment.

A washing machine 100 according to an embodiment ma include a voice inputter 101 and a processor 120.

The washing machine 100 is a device performing washing of clothing using a power of a machine and may include a power saving mode, a standby mode, and an operation mode.

The voice inputter 101 may be hardware capable of recognizing a sound and may in particular recognize a user voice.

The voice inputter 101 may include a microphone. The microphone is configured to receive a voice input, and the microphone may include various configurations such as a microphone for collecting user voice in an analog format, an amplifier circuit for amplifying the collected user voice, an audio-to-digital (A/D) conversion circuit for sampling the amplified user voice to convert into a digital signal, a filter circuitry for removing a noise element from the converted digital signal, or the like.

The processor 120 according to an embodiment may be implemented with at least one of a digital signal processor (DSP), a microprocessor, and a time controller (TCON), a central processing unit (CPU), a micro controller unit (MCU), a micro processing unit (MPU), a controller, an application processor (AP), a communication processor (CP), and an advanced reduced instruction set computing (RISC) machine (ARM) processor or may be defined as a corresponding term. The processor may be implemented in a system on chip (SoC) type or a large scale integration (LSI) type in which a processing algorithm is built therein or in a field programmable gate array (FPGA) type.

The washing machine 100 includes the processor 120 to, when the user voice is received through the voice inputter 101 in the power saving mode of the voice inputter 101 and the washing machine 100, switch the washing machine 100 to the standby mode of the washing machine 100 based on the wake-up word included in the user voice, maintain the standby mode of the washing machine 100 based on a control word included in the user voice, or switch the washing machine 100 to the operation mode, and execute the operation corresponding to the control word in the standby mode or the operation mode.

The power saving mode may refer to a state in which only a power control button among buttons included in the washing machine 100 is activated. For example, when the user presses the power button in the power saving mode of the washing machine 100, the power of the washing machine 100 may be supplied. In the power saving mode of the washing machine 100, if the user presses a button other than the power button, the washing machine 100 may not perform any operation. The power saving mode may refer to a state in which power is supplied to only a processor that controls only the voice inputter 101. The power saving mode may be at least one of a mode for activating a power control button to change the power state of the washing machine 100 to a power-on state (power control via a button) or activating a processor that controls the voice inputter 101 so that the user may change the power state to the power-on state (power control via voice recognition). That a specific hardware configuration is activated may mean that a particular hardware configuration is being powered from a power source, and that particular hardware may perform a particular operation.

In the standby mode, at least one element of the processor controlling the power control button or the voice inputter 101 may be activated, and a main processor may process information stored in a memory. The standby mode may be a state in which a cleaning process (including washing, rinsing, dehydrating, and drying functions) of the washing machine 100 may not be immediately performed. For example, the washing machine 100 may only provide information stored in the memory in the standby mode, and may not immediately perform functions such as washing, rinsing, dehydrating, drying, or the like, such as motor driving. The washing machine 100 may display information on a display or provide information via a voice output to provide information.

The operation mode may refer to a state in which all the operations of the washing machine 100 may be immediately performed. In the operation mode, all buttons of the washing machine 100 may be activated. For example, when the user presses a button to perform the washing process of the washing machine 100, the washing machine 100 may immediately perform a washing process corresponding to the button pressed by the user. It has been described that the user controls the washing machine 100 by pressing a button, but the user may control the washing machine 100 through a voice recognition function.

In terms of power consumption, the operation mode may consume the greatest power among three modes (power saving mode, standby mode, and operation mode). To immediately perform the operations associated with the washing process, the processor 120 may have to pre-supply power to the hardware configuration associated with a motor and consume the greatest power. The standby mode may not be a stage in which the washing machine 100 prepares for driving the motor, but the standby mode may correspond to a mode that consumes minimal power to perform memory access and some algorithms (or calculation). In the power saving mode, the washing machine 100 may consume power only in the hardware configuration associated with the power control. Accordingly, in the power consumption aspect, the washing machine 100 may consume more power consumption in the order of an operation mode, a standby mode, and a power saving mode.

With respect to a manipulation inputter (button), only a button associated with power control may be activated in the power saving mode and the standby mode, and other buttons may be inactivated.

With respect to the voice recognition part, the voice recognition part may be activated in all the power saving mode, standby mode, and operation mode.

With respect to the motor control performing cleaning process, hardware related to motor control may all be inactivated in the power saving mode and the standby mode, and in the operation mode, hardware related to the motor control may be activated.

The user voice may be received through the voice inputter 101. The user voice may include the wake-up word and the control word.

The wake-up word may be a word for calling the washing machine 100, and the control word may be a word for controlling the washing machine 100. For example, the wake-up word may be words such as a "washing device," "Bixby," or the like, and the control word may be words such as "washing," "dehydrating," "drying," or the like. The wake-up word may be a command to switch from a power saving mode which is one of the operating state of the washing machine 100 to the standby mode.

The wake-up word may be different according to a user setting, and is assumed to be "Bixby" in describing the disclosure. When the user utters a voice including "Bixby," the processor 102 may control so that the state of the washing machine 100 is switched from the power saving mode to the standby mode.

The processor 120 may receive and analyze user voice via the voice inputter 101. If the user voice includes the wake-up word, the processor 120 may switch the washing machine 100 from the power saving mode to the standby mode. The processor 120 may identify whether there is a control word in the user voice. When the control word is included in the user voice, the processor 120 may control to perform an operation corresponding to the control word in the standby mode and the operation mode.

The processor 120 may identify whether an operation corresponding to the control word is executable in the standby mode (or a state in which the power is turned off), if the operation is identified as being executable in the standby mode, the processor 120 may execute an operation corresponding to the control word in the standby mode, and if the operation is identified as not executable in the standby mode, the processor 120 may switch the washing machine 100 to the operation mode and execute an operation corresponding to the control word.

The control word included in the user voice may consist of a combination of words associated with the control of the washing machine 100. For example, a combination of words associated with the operation of the washing machine 100, such as "washing," "40 degrees of hot water," and "high speed" may be made. For performing the operation of the washing machine 100 corresponding to the control word, a mode of the washing machine 100 needs to be identified (determined). For example, when the washing machine 100 is in the power saving mode, even if there is a user's control command, the operation corresponding to the control command may not be performed immediately. In order to perform an operation corresponding to the control command, the washing machine 100 may have to be in at least the standby mode or the operation mode. When the washing machine 100 is in the operation mode, the washing machine 100 may perform all control commands corresponding to the user voice. When the washing machine 100 is in the standby mode, the washing machine 100 may perform some control commands corresponding to the user voice. For example, in the operation mode, the washing machine 100 may perform 100% of the operation that may be performed. In the standby mode, 50% of the operation of the washing machine 100 may be performed.

The processor 120 may identify (or determine) whether the control word included in the user voice may be performed in the standby mode. If the control word included in the user voice may be performed in the standby mode, the processor 120 may control to perform an operation corresponding to the control word directly in the standby mode. When the washing machine 100 is not switched to the operation mode and the operation corresponding to the control word is performed in the standby mode, it is possible to save power consumption than switching the standby mode to the operation mode. If the control word included in the user voice may not be performed in the standby mode, the processor 120 may switch the washing machine 100 to the operation mode and control the control operation corresponding to the control word to be performed.

If the control word includes at least one of a word associated with the state of the washing machine 100 and a word associated with washing process recommendation, the processor 120 may identify that an operation corresponding to the control word is executable in the standby mode.

The standby mode is a mode in which only some of the operations executable by the washing machine 100 may be performed as described above. In the standby mode, control operations which pre-requires motor driving may not be performed directly. The control operations which do not require motor driving may be performed directly in the standby mode. For example, a control operation for retrieving information stored in the memory may be performed in a standby mode. If at least one of the word associated with the current state of the washing machine or the word associated with the washing process recommendation is included in the user voice, the processor 120 may perform the control operation directly in the standby mode. The processor 120 may directly provide the current state information of the washing machine to the user in the standby mode, using the memory in which the current state of the washing machine is stored. The processor 120 may directly recommend any one of the washing processes to the user in the standby mode, in response to the user's question regarding the washing process.

The power saving mode and the standby mode may refer to a state in which only a power button among at least one button provided in the washing machine 100 is activated, and the operation mode may refer to a state in which at least one button other than the power button is activated.

The washing machine 100 may include a manipulation inputter composed of a plurality of buttons. For example, the operation inputter may include a button for controlling the washing machine 100 to be turned on/off, a button for selecting a washing process, a button for setting a reservation time, a button for setting the temperature of the water, a button for setting the intensity of the dehydration, or the like. The types of buttons described above are exemplary, and the manipulation inputters are not limited to the buttons described above. In the power saving mode and the standby mode of the washing machine 100, only the power control button may have been activated. In the power saving mode and standby mode of the washing machine 100, only the power control buttons are activated. In the operation mode of the washing machine 100, all buttons other than the power control button and the power control button may have been activated. In the operation mode, all control operations may be executable, and all buttons may have been activated. Being activated may mean that power is supplied to a corresponding hardware configuration and may directly react to a control command of a user.

When the word associated with a washing process and a word associated with a detailed option of the washing process are included in the user voice, the processor 120 may switch the standby mode to the operation mode, and may proceed with a washing process based on a detailed option.

The word associated with the laundering process may be washing, rinsing, dehydrating, drying, or the like. The words associated with the detailed options of the washing process may correspond to a type of laundry, the washing course setting, the washing temperature setting, the dehydrating intensity, the drying temperature, the reservation time, or the like. The foregoing words are merely exemplary and various other words may be registered by the setting.

If the word associated with the washing process is included, but the word associated with the detail option of the washing process is not included, the processor 120 may perform the washing process with a default (predetermined) basic setting. For example, if the processor 120 analyzes the user voice and recognizes that the user utters "Bixby, start washing," the processor 120 may perform a process to perform a basic washing course, a temperature of 40 degrees, a dehydration with an intermediate intensity, or the like. The details may be changed by the user settings.

The control operations associated with the washing process described above may all be operations that must drive the motor. The washing, rinsing, dehydrating, drying, or the like, may correspond to a control operation that requires the use of a motor or the like included in the washing machine 100. Therefore, it is not possible to perform a control operation related to the washing process just described in the standby mode of the washing machine 100. Since the processor 120 does not supply power to the hardware associated with the motor drive in the standby mode, the processor 120 may not control to perform a control operation associated with the washing process directly in the standby mode. The processor 120 may change the mode of the washing machine 100 from the power saving mode or the standby mode to the operation mode to perform a control operation associated with the washing process.

The processor 120 may include a main processor 121 and a sub-processor 122, and a first sub-processor 122 may operate in a normal state in a power saving mode, perform voice recognition on user voice, and transmit, to the main processor 121, a first control signal to switch the washing machine 100 to a standby mode based on a wake-up word included in the user voice, and the main processor 121 may switch the washing machine 100 to a standby mode when a first control signal is received from the first sub-processor 122.

The main processor 121 may operate in a power saving state in the power saving mode, and when the first control signal is received from the first sub-processor 122, the state of the main processor 121 may be switched from the power saving state to the normal state so that the washing machine 100 may be switched to the standby mode.

The washing machine 100 may operate by a single processor and may operate using a plurality of processors. The processor of the washing machine 100 may include a first sub-processor 122, a second sub-processor 123, and the main processor 121. The main processor 121, the first sub-processor 122, and the second sub-processor 123 may be in a power saving state or a normal state.

The power saving state is a state in which power is not supplied by a power supplier, and a processing operation is not executable. The normal state is a state in which power is supplied by the power supplier, and may be in a state in which a processing operation may be performed. For example, the main processor 121 may not perform any operation in the power saving state, but in the normal state, the main processor 121 may perform various processing operations that the main processor 121 may perform. Although the above description indicates that each processor may be in the power saving state or the normal state, the various hardware configurations that compose the washing machine 100 may be in a power saving state or the normal state.

The first sub-processor 122 may operate in a normal state in the power saving mode of the washing machine 100, and may perform voice recognition on the user voice received through the voice inputter 101. Since the washing machine 100 needs to always recognize the user voice even in a state in which power is turned off (power saving mode or standby mode), the first sub-processor 122 may operate in a normal state even if the washing machine 100 is in a power saving mode and may not be limited with performance.

If the first sub-processor 122 identifies that a wake-up word is included in the user voice, the first sub-processor 122 may generate a first control signal to switch the washing machine 100 from the power saving mode to the standby mode. The first sub-processor 122 may transmit the generated first control signal to the main processor 121. When the main processor 121 receives the first control signal, the main processor 121 may switch from the power saving state to the normal state. The main processor 121, which is switched to the normal state, may access the memory to read or process data. At a time when the main processor 121 is changed from the power saving state to the normal state, the main processor 121 may not supply power to the hardware driving the motor. This state of the washing machine 100 may be expressed such that the washing machine 100 is in the standby mode.

The processor 120 may control a display, further include the second sub-processor 120 operating in a power saving state in the power saving mode, and the main processor 120, based on receiving the first control signal from the first sub-processor 122, may transmit, to the second sub-processor 123, a second signal to switch the second sub-processor 120 from the power saving state to the normal state.

The second sub-processor 123 may control the display 102, which is a component of the washing machine 100, and may operate in a power saving state in a power saving mode. When the second sub-processor 123 operates in a power saving mode, if the washing machine 100 is in the power saving mode, a performance of the second sub-processor 123 may be limited, and the state of the second sub-processor 123 in the power saving mode may be in a power saving state.

However, when the washing machine 100 is in the standby mode, the second sub-processor 123 may be in a normal state. The second sub-processor 123 in the normal state may control the display to display specific information on the display. When the main processor 121 receives the first control signal transmitted by the first sub-processor 122, the main processor 121 may transmit, to the second sub-processor 123, a second control signal to switch the second sub-processor 123 from the power-saving state to the normal state. When the second sub-processor 123 receives the second control signal from the main processor 121, the second sub-processor 123 may be changed from the power saving state to the normal state.

The main processor 121 and the second sub-processor 123 may be connected via (or through) a first data communication line and a first power control line, the first sub-processor 122 and the second sub-processor 123 may be connected via (or through) the second data communication line, the main processor 121 and the first sub-processor 122 may be connected via (or through) the second power control line, and the control signal for switching the washing machine 100 to the standby mode may be transmitted from the first sub-processor 122 to the main processor 121 via (or through) the second power control line.

The connection between the data communication line and the power control line will be described in greater detail with reference to FIG. 4.

The display may include a manipulation input panel, and the second sub-processor 123 may, based on receiving the second control signal from the main processor 121, be switched to the normal state, and when the washing machine 100 is switched to the operation mode, at least one button other than a power button included in the manipulation input panel may be activated.

The display consists of a touch screen and may receive a user input while displaying a particular image. If it is identified that the wake-up word is included in the user voice, the main processor 121 may transmit the second control signal to the second sub-processor 123, and the second sub-processor 123 may be switched from the power saving state to the normal state. The manipulation input panel may refer to a manipulation inputter made of a button or a touch screen. Some of the manipulation inputter or the manipulation input panel may be in a form of a button, and another portion may be in the form of a touch panel of the display.

If the washing machine 100 is in the standby mode, only the display function may be activated, and the operation input panel may not be activated. For example, if the washing machine 100 is in the standby mode, the display may display a particular image or information through the display, but the user's touch input through the display may not be sensed. When the washing machine 100 is in the standby mode, the main processor 121 may activate only a manipulation input button (panel) for power control.

When the washing machine 100 is in the operation mode, the main processor 121 may activate a manipulation input panel function of the display. If the washing machine 100 is in the operation mode, the main processor 121 may sense a user's touch. If the washing machine 100 is in the operation mode, the main processor 121 may activate all the buttons other than the manipulation input button (panel) for power control.

The washing machine 100 may include an upper washing machine 1105 and a lower washing machine 1110, and the first sub-processor 122 may be included in any one of the upper washing machine 1105 or the lower washing machine 1110, and the second sub-processor 123 and the main processor 121 may be included in each of the upper washing machine 1105 and the lower washing machine 1110.

The washing machine 100 may include the upper washing machine 1105 and the lower washing machine 1110, and the upper washing machine 1105 and the lower washing machine 1110 may be arranged vertically or horizontally to each other so that a voice inputter may be disposed only in at least one washing machine among the upper washing machine 1105 and the lower washing machine 1110. The first sub-processor 122 controlling the voice inputter may also be included in at least one washing machine among the upper washing machine 1105 and the lower washing machine 1110 (see FIG. 8). Although each of the second sub-processors 123 and 223 and the main processors 121 and 221 may be included in the upper washing machine and the lower washing machine, the first sub-processor 122 may include only one. Since the first sub-processor 122 serves to analyze the user voice, the first sub-processor 122 does not have to be separately configured in the upper washing machine and the lower washing machine in the same space. Accordingly, the upper washing machine and the lower washing machine include separate second sub-processors 123 and 223 and main processors 121 and 221, respectively, but only one of the first sub-processors 122 may be configured.

According to another embodiment, the voice inputter (or the first processor 122) may be included in each of the upper washing machine 1105 and the lower washing machine 1110.

Each display and processor may be included in the upper washing machine 1105 and the lower washing machine 1110. A display is displayed on each of the upper washing machine 1105 and the lower washing machine 1110 so that the user may easily grasp which function is performed by each device. The main processor is separately configured and operations necessary for each device are performed separately, and a throughput or processing speed may be improved, and power may be saved as well.

The first sub-processor 122 may identify whether an operation corresponding to the control word included in the user voice is executable in the standby mode (the power-off state) of the washing machine 100, and if the operation is identified as being executable in the standby mode (the power-off state), the first sub-processor 122 may transmit a control signal for executing an operation corresponding to the control word to at least one of the second sub-processors 123 and 223 and the main processors 121 and 221 included in the upper washing machine and the lower washing machine, respectively.

The first sub-processor 122 is identified as not being executable in the power-off state, the first sub-processor 122 may transmit a control signal for switching the washing machine 100 to the power-on state to at least one of the second sub-processors 123, 223 and the main processors 121, 221, included in each of the upper washing device and the lower washing device.

A specific description about the upper washing machine and the lower washing machine will be described with reference to FIG. 8.

In the embodiment described above, if the wake-up word is identified in the user voice, the first sub-processor 122 directly changes the power saving state to the normal state. The main processor 121 analyzes a control word included in the user voice and identify whether the control word is executable in the standby mode or the operation mode.

According to still another embodiment, the first sub-processor 122 may not generate a control signal to directly change the state of the main processor 121 to the normal state according to the wake-up word.

The first sub-processor 122 may identify whether the operation corresponding to the control word included in the user voice is executable in the standby mode (the power-off state) of the washing machine 100, and if the operation is identified as being executable in the standby mode, the first sub-processor 122 may transmit a control signal for executing an operation corresponding to the control word to at least one of the second sub-processors 123 and 223 and the main processors 121 and 221, and if the operation is identified as not being executable in the standby mode, the first sub-processor 122 may transmit a control signal to switch the washing machine 100 to the operation mode to at least one of the second sub-processor 123 or the main processor 121.

The first sub-processor 122 may perform a voice recognition function on the user voice, compare the contents stored in the existing memory, and analyze the voice recognition result. It is assumed that the user voice includes a wake-up word and a control word. If the first sub-processor 122 identifies that a wake-up word is included in the user voice, the first sub-processor 122 identifies whether a control word is included in the user voice. If the first sub-processor 122 may identify that the user voice includes a control word, whether an operation corresponding to the control word of the user is executable in the standby mode or the operation mode may be determined in consideration of the information stored in the memory.

If the first sub-processor 122 identifies that the control word corresponds to the standby mode, the first sub-processor 122 may generate a control signal to change the washing machine 100 to the standby mode. To be specific, the first sub-processor 122 may generate and transmit a control signal for changing at least one of the second sub-processor 123 and the main processor 121 to the normal state.

If it is identified that the first sub-processor 122 is not a word corresponding to the standby mode, the first sub-processor 122 may determine whether the control word is a word corresponding to the operation mode. If the control word is identified as corresponding to the operation mode, the first sub-processor 122 may generate a control signal to switch the washing machine 100 to the operation mode and transmit the control signal to at least one of the second sub-processor 123 or the main processor 121.

If the first sub-processor 122 determines that the control word is a word which does not belong to any of the standby mode or the operation mode, the first sub-processor 122 may not perform any operation corresponding to the user voce without generating any control signal.

The washing machine 100 may include the upper washing machine 1105 and the lower washing machine 1110, and the processor 120 may identify at least one of the upper washing machine 1105 or the lower washing machine 1110 to execute an operation corresponding to the control word based on the identification information of the washing machine 100 included in the user voice.

An operation executable by the upper washing machine 1105 and an operation executable by the lower washing machine 1110 may be divided. For example, A, B, and C operations are available in the upper washing machine 1105, and A, D, and E operations are available in the lower washing machine 1110.

The processor 120 may identify the control word included in the user voice and determine whether the upper washing machine 1105 or the lower washing machine 1110 may perform the operation corresponding to the control word.

For example, the user may utter "Bixby, please execute an operation B." The processor 120 may identify that the control word (B) included in the user voice may be executed only by the upper washing machine 1105.

For example, the user may utter "Bixby, please execute an operation B." The processor 120 may identify that the control word (A) included in the user voice may be performed by both the upper washing machine 1105 and the lower washing machine 1110.

The processor 120 may provide a user with information that the operation corresponding to the control word of the user is executable by at least one of the upper washing machine 1105 or the lower washing machine 1110. A method of providing to a user may include a method of providing via a screen through a display or a method of providing a voice via a speaker.

The washing machine 100 may include the upper washing machine 1105 and the lower washing machine 1110, and based on the user voice not including the identification information of the washing machine 100, the processor 120 may switch both the upper washing machine 1105 and the lower washing machine 1110 to the operation mode (or standby mode), or switch the lower washing machine 1110 to the operation mode (or standby mode).

The user may specify the upper washing machine 1105 and the lower washing machine 1110 and transmit the control command to the washing machine 100. For example, the user may utter, "please execute an operation A in the upper washing machine 1105" and "please execute an operation D in the lower washing machine 1110." The processor 120 may identify a device uttered by the user and control so that the device executes an operation.

For example, a user may not utter a word such as an upper portion or a lower portion (e.g., "please execute operation A"). In this example, the processor 120 may identify that both the upper washing machine 1105 and the lower washing machine 1110 perform the operation A.

In the same situation, the processor 120 may determine to execute A operation only in the lower washing machine 1110. Generally, that a user has not specified a washing machine may mean to execute a basic operation. Thus, if the processor 120 has not recognized the upper or lower word in a situation where the upper washing machine and the lower washing machine is divided, the processor 120 may determine that the user wishes to control either the upper or the lower washing machine executing the basic function. Here, the washing machine 100 executing the basic function may be the lower washing machine 1110. In general, a device having wider functions weighs heavy and may be placed at a lower portion.

The control word indicating the upper washing machine 1105 or the lower washing machine 1110 may be a control operation using a motor of the washing machine 100. When the upper washing machine 1105 or the lower washing machine 1110 is recognized, the processor 120 may switch the washing machine 100 to the operation mode.

As described above, the washing machine 1100 according to an embodiment provides power to only certain hardware according to the operation of the processor. The disclosure may reduce overall power consumption compared to the related art which has to supply power to all of the hardware. In particular, in the disclosure, a mode of the washing machine 100 is divided into the power saving mode, the standby mode, and the operation mode, and hardware supplied with power according to each mode is device. In the disclosure, in the standby mode, a simple operation such as a memory access is performed, and in the operation mode, an operation requiring large power consumption such as driving a motor is performed. When the processor 120 recognizes a control word that may be performed in the standby mode, the processor 120 may supply power to only some hardware without supplying power to the hardware required for driving the motor. Therefore, the embodiment may increase power efficiency when all operations of the washing machine 100 are divided into power on/off.

According to a still another embodiment, the processor 120 may identify whether an operation corresponding to the control word included in the user voice is executable in a state where the washing machine 100 is turned off (power saving mode or standby mode).

The type of control command that the user sends to the washing machine 100 may be various. For example, the user's control command may be a command which is executable only when the washing machine 100 is powered on (or operation mode), and may be a command that is executable if the washing machine 100 in powered off. Thus, the processor 120 may identify whether to keep the power of the washing machine 100 to be off state or on state.

The command executable only when the power of the washing machine 100 is on (or operation mode) may include washing, rinsing, dehydrating, drying, and the like. The command executable even when the washing machine 100 is in the off state may correspond to a command requesting an answer to a question, such as asking the ambient temperature of the washing machine or asking whether the current washing machine is normally operated.

The examples of the commands described above are merely exemplary and various embodiments are applicable.

If the operation corresponding to the control word included in the user voice is identified as being not executable in the power off state, the processor 120 may switch the washing machine 100 to a power-on state and may execute an operation corresponding to the control word. The power-on state may correspond to the operation mode.

If it is identified that the operation corresponding to the control word included in the user voice is executable in the power off state, the processor 120 may execute an operation corresponding to the control word in the standby mode.

The processor 120 may save power by determining whether to perform an operation corresponding to a control word in a standby mode or to switch to a power-on state to execute an operation corresponding to a control word. When the above-described identification operation of the processor 120 is performed, it is not necessary to always switch to the power-on state in order to perform an operation corresponding to the control word of the user, power may be saved.

When the control word includes at least one of the word associated with the state of the washing machine 100 or the word associated with the washing process recommendation, the processor 120 may identify that the operation corresponding to the control word is executable in the power off state.

The word associated with the state of the washing machine 100 may be a question asking a current state of the washing machine 100. For example, if the weather falls down to zero and water freezes, a drain of the washing machine may be blocked and a normal operation may not be performed. Thus, the user may ask the state of the washing machine 100 before giving a washing command. The washing machine 100 needs not to be powered on to transmit the current state of the washing machine 100 to the user, and if the word asking the state of the washing machine 100 is included in the user voice, the processor 120 may identify that the operation corresponding to the control word is executable in the power-off state. The word associated with the state of the washing machine 100 may be a predetermined word according to the user's setting and may be modified.

A word associated with the washing process recommendation may be a command to recommend a washing mode according to the type of laundry before the user gives a specific washing command. For example, if the user tells a type of laundry, the processor 120 may recommend a washing mode suitable for the type of laundry.

If the user voice includes the washing process and the washing process includes a detailed option, the processor 120 may perform the washing process based on the detailed option. The meaning based on the detailed option may be that the user may change the detailed option. For example, a standard washing mode, which is one of a plurality of washing modes, may be set to a washing one time, a rinsing three times, and a dehydration two times. The user may add the rinsing function once in a standard washing mode. The washing process may be a standard washing mode and a detailed option may be a rinsing function. If the user utters "Bixby, please add a rinsing function once to the standard washing mode," the processor 120 may control the washing machine 100 so that washing is performed with a washing one time, a rinsing four times, and a dehydration two times.

The processor 120 may provide feedback indicating that the washing machine 100 is switched to a power on state if the washing machine 100 is switched to a power on state according to user voice. For example, when the washing machine 100 is switched to the power-on state, the processor 120 may output a screen notifying that the power is turned on to the display or output a preset sound notifying that the power source is turned on powered through the voice outputter. The processor 120 may inform the user that the power of the washing machine 100 is turned on by making a light emitting diode (LED) of the manipulation input panel be turned on.

The washing machine 100 may include an upper washing machine and a lower washing machine. The upper washing machine and the lower washing machine are a separate washing machine for performing a washing function and a space thereof may be separated. The upper washing machine and the lower washing machine may be different in capacity to process laundry. The functionality may also be different.

For example, the upper washing machine operates in a fully automatic manner and may process a small amount of laundry. The lower washing machine may operate in a drum format and may process a large amount of laundry.

The upper washing machine and the lower washing machine may each include a separate processor, a manipulation input panel, and a display. However, the voice inputter of the upper washing machine may be the same as the voice inputter of the lower washing machine. Since the upper washing machine and the lower washing machine are in the same space, there is no need to have a separate voice inputter. Therefore, even if the configuration for each operation exists separately, the voice inputter may be included only on one side of the upper washing machine or the lower washing machine.

The processor 120 may identify a device to execute an operation corresponding to a control word between the upper washing machine and the lower washing machine based on the identification information of the washing machine 100 included in the user voice. If the user utters "Bixby, start standard washing at the upper washing machine," the processor 120 may control the upper washing machine to operate. The identification information of the washing machine 100 may be a word "upper washing machine". The identification information may be a word representing an upper washing machine or a lower washing machine, and may be added and changed according to the user's setting.

The washing machine 100 may include an upper washing machine and a lower washing machine, and the processor 120 may switch both the upper washing machine and the lower washing machine to the power-on state if the identification information of the washing machine 100 is not included in the user voice. For example, if the user utters the voice "Bixby, please power on," the processor 120 may control to switch the power of both the upper washing machine and the lower washing machine to the power-on state, since the user has not specified any one of the upper washing machine and the lower washing machine.

If the user speaks "Bixby, please start standard washing," it may be confusing if washing should be executed in the upper washing machine or the lower washing machine. In this example, the processor 120 may switch the power of both the upper washing machine and the lower washing machine to the power-on state, and identify the location where the laundry is placed, for example. If it is identified that the laundry is included in the upper washing machine, the processor 120 may automatically control to start standard washing in the upper washing machine. Further, if it is identified that the laundry is included in the lower washing machine, the processor 120 may control to automatically start standard washing in the lower washing machine.

The washing machine 100 may include an upper washing machine and a lower washing machine, and the processor 120 may switch the lower washing machine to a power-on state if the identification information of the washing machine 100 is not included in the user voice, and may execute an operation corresponding to the control word in the lower washing machine. For example, if the user utters the voice "Bixby, please power on," the processor 120 may set a priority on the lower washing machine to switch the lower washing machine to the power on state and may perform an operation corresponding to the control word in the lower washing machine.

In the above operation, the priority is set to the lower washing machine, but in actual implementation, the priority is set to the upper washing device to switch the upper washing device to a power-on state and the upper washing device may execute an operation corresponding to the control word.

The processor 120 may store the operation pattern of the user in the memory, and may set the priority to a washing machine which is used most frequently for a predetermined period of time. For example, if the user uses the upper washing machine three times for one month, and use the lower washing machine for ten times, the priority may be set to the lower washing machine.

By the operation of the processor 120, the washing machine 100 may not necessarily switch the power of the washing machine 100 to a power-on state according to a control word included in the user voice. The power consumption may be effectively reduced when the power of the washing machine 100 is turned on every time.

Figure 1B:
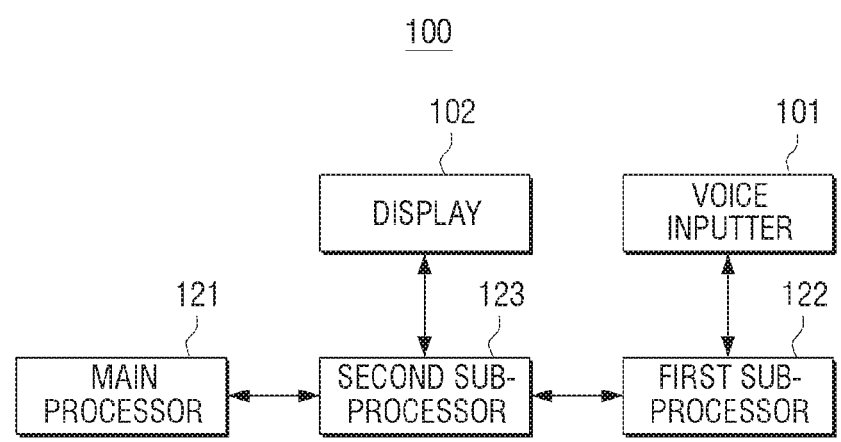
FIG. 1B is a block diagram illustrating a washing machine according to another embodiment.

FIG. 1B is a block diagram illustrating a washing machine according to another embodiment.

The operation of FIG. 1B which is the same as the description above will not be further described.

The washing machine 100 may include the power saving mode, the standby mode, and the operation mode.

The power saving mode may refer to a state in which the washing machine 100 is plugged into a power plug. The power saving mode may be the same as the state where the user presses a power off button. The washing machine 100 may be set so that the display and manipulation input panel do not operate in a power saving mode, and may be set to maintain minimal power. The washing machine 100 may also limit the performance of the processor in order to maintain minimal power in the power saving mode.

Since the user voice has to be received even in the power saving mode, a part associated with the voice inputter 101 may maintain performance. For example, in the power saving mode, the washing machine 100 may limit the performance of the processor, but may not limit the performance of the voice inputter 101.

The standby mode may refer to a state in which a preparation is ready so that a specific function of the washing machine 100 may be directly operated. In the standby mode, unlike the power saving mode, the performance of the processor may not be limited. In the standby mode, the manipulation input panel may be in an inactivated state. The washing machine 100 does not limit the performance of the processor in the standby mode, but the manipulation input panel may maintain the inactivated state.

The washing machine 100 may not display a display screen in the standby mode. Displaying a specific screen on the display may be different according to the washing machine 100.

The operation mode may refer to a state immediately executable when the user gives a washing command, and may refer to a state in which the washing machine 100 is turned on, for example, a user presses a power on button. In the operation mode, the display and manipulation input panel of the washing machine 100 may be activated.

The power saving mode and standby mode may be different in the aspect of whether the performance of the processor is limited and whether the minimum power usage is maintained. In the power saving mode, the performance of the processor may be limited and a minimum power usage is maintained, but in the standby mode, the performance of the processor is not limited, and the general power usage is maintained.

The standby mode and the operating mode may be different in the aspect of whether the washing machine 100 is powered on. The standby mode may refer to a state in which the power plug is connected to the washing machine 100, but the power source is turned off, and the operating mode may refer to a state in which the power plug is connected to the washing machine 100 and the power source is turned on. In the standby mode, the operation input panel and the display are not activated, but in the operation mode, the operation input panel and the display may be activated. The operation input panel may not be activated in the standby mode, but only the power button may be activated.

The power saving mode and standby mode may be different in the aspect of whether the performance of the processor 102 is limited and whether the minimum power usage is maintained. In the power saving mode, the performance of the processor 102 is limited and a minimum power usage is maintained, but the standby mode may correspond to a state to maintain a typical power usage without limiting the performance of the processor 102.

The power saving mode and the standby mode may refer to a state in which the power of the washing machine 100 is turned off and only the power button is activated. The power-on state may refer to a state in which at least one button other than the power button is activated.

The power saving mode, standby mode, and operation mode are for indicating the state of the washing machine 100, and a state of each element constituting the washing machine 100 may be divided into a power saving state and a normal state, respectively.

The power saving state may refer to a state that limits the performance of the hardware. For example, when the washing machine 100 is in a power saving mode, performance of component A may be limited to lower power consumption. If the washing machine 100 is in the power saving mode, to lower power consumption, the A, which is an element of the washing machine 100, may be in a power saving state.

A normal state may generally refer to a state in which the performance of the hardware is not limited. For example, the washing machine 100 may perform an operation corresponding to a user command by converting the element A in the power saving state into a normal state. A normal state may generally refer to a state in which the device may operate.

However, if the state of a particular element is in the normal state, the power supply of the washing machine 100 may be on or off. The element A of the washing machine 100 may be in a normal state even when the power source of the washing machine 100 is in an off state.

The mode of the washing machine 100 may vary, even if the particular element is in the normal state. The particular element may be in a normal state even if the washing machine 100 is in a power saving mode. It is not necessary that all of the elements be in a power saving mode even though the washing machine 100 is in a power saving mode. Since a particular element must always maintain constant performance regardless of the state of the washing machine 100, the washing machine 100 may be set to operate in different states for each element. Therefore, the particular element may be in a normal state even though the washing machine 100 is in the power saving mode, the standby mode, and the operation mode.

The display 102 may be implemented as various types of displays such as a liquid crystal display (LCD), organic light emitting diodes (OLED) display, plasma display panel (PDP), a touch screen, or the like.

Information related to the washing machine 100 may be displayed on the display 102. Information related to the user voice input through the voice inputter 101 may be displayed. For example, whether the user inputs a voice and a result of analyzing a word uttered by the user may be displayed.

The display 102 may include a manipulation input panel, and the second sub-processor 123 may switch to a normal state when the second control signal is received from the main processor 121, and may activate at least one button other than the power button included in the manipulation input panel when the washing machine 100 is switched to the power-on state. The manipulation input panel may include a button or a dial for selecting a particular function of the washing machine 100, and may further include a button for executing the selected function.

The display 102 may display information about the operation of the washing machine 100. For example, if the state of the washing machine 100 is changed according to an operation corresponding to the voice of the user, the display 102 may display information on the changed contents. If the washing machine 100 is switched from the power saving mode to the standby mode by the wake-up word of the user, the display 102 of the washing machine 100 may be displayed with the changed standby mode.

In the display 102, a backlight unit, a driving circuit which may be implemented as an a-si TFT, low temperature poly silicon (LTPS) TFT, organic TFT (OTFT), or the like, may be included as well. The display 102 may be implemented as a flexible display.

The display 102 may include a touch sensor for sensing a user's touch gesture. The touch sensor may be implemented with various types of sensors, such as capacitive, resistive, piezoelectric, or the like. The electrostatic type uses a dielectric coated on the surface of the display 102, so that when a part of the body of the user is touched on the surface of the display 102, the micro-electricity excited to the human body is sensed and the touch coordinate is calculated. The resistive method includes two electrode plates embedded in the display 102, so that when a user touches a screen, the upper and lower plates of the touched point are contacted to sense that a current flows, thereby calculating a touch coordinate. If the user terminal device also supports pen input function, the display 102 may also detect user gestures using input means, such as a pen, in addition to the user's finger. When the input means is a stylus pen including a coil therein, the user terminal device may include a magnetic field detecting sensor capable of sensing a magnetic field that is changed by a coil inside the stylus pen. Thus, proximity gestures, that is, hovering, as well as touch gestures, may also be detected.

While one display 102 has been described as performing both a display function and a sensing function of a touch gesture, in implementation, the display function and the gesture sensing function may be performed in different configurations. The display 102 may be implemented by combining the display 102 capable of displaying an image only and a touch panel capable of sensing touch only.

The washing machine 100 may include the manipulation input panel together with the display 102. The manipulation panel may be composed of a touch panel and may be in a button format, for example.

The washing machine 100 may operate using one processor or may operate using a plurality of processors. The processor of the washing machine 100 may include the main processor 121, the first sub-processor 122, and the second sub-processor 123.

The first sub-processor 122 may operate in a normal state in the power saving mode of the washing machine 100, and may perform voice recognition on the voice of the user received through the voice inputter 101. Since the washing machine 100 should always recognize the user voice even when power is off, the first sub-processor 122 may operate in a normal state even if the washing machine 100 is in a power saving mode and is not limited in performance.

The second sub-processor 123 may control the display 102, which is an element of the washing machine 100, and may operate with a power saving state in a power saving mode. When the washing machine 100 is in a power saving mode, the second sub-processor 123 may be limited in performance, and the second sub-processor 123 may be set to be in the power saving state.

When the washing machine 100 is in a power saving mode, the washing machine 100 may receive the user voice through the voice inputter 101. The first sub-processor 122 may identify whether there is a wake-up word included in the user voice received via the voice inputter 101. If the first sub-processor 122 determines that there is a wake-up word in the user voice, the first sub-processor 122 may transmit to the main processor 121 a first control signal to switch the washing machine 100 to the standby mode.

When the first control signal is received from the first sub-processor 122, the main processor 121 may transmit the second control signal to switch the second sub-processor 123 from the power saving state to the normal state to the second sub-processor 123.

When the washing machine 100 is in a power saving mode, the main processor 121 may operate in a power saving state, and when a first control signal is received from the first sub-processor 122, the main processor 121 may switch the power saving state to a normal state and may switch the washing machine 100 to a standby mode. Only after the main processor 120 being switched to the normal state, it can be seen that the washing machine 100 is switched to the standby mode, and the state switching of the main processor 121 may be a part of the standby mode switching process of the washing machine 100.

When the user voice data is received, the main processor 121 may identify whether an operation corresponding to the control word included in the data is executable when the power of the washing machine 10 is off.

If it is identified that the operation corresponding to the control word is executable in the power-off state of the washing machine 100, the main processor 121 may control the washing machine 100 so that the operation corresponding to the control word is executed in the standby mode of the washing machine 100.

When it is identified that the operation corresponding to the control word is not executable in the power-off state, the main processor 121 may switch the washing machine 100 to the power-on state and may execute an operation corresponding to the control word. The power-on state of the washing machine 100 may correspond to the operation mode.

The main processor 121 and the second sub-processor 123 may be connected via (or through) the first data communication line 405 and the first power control line 415, the first sub-processor 122 and the second sub-processor 123 may be connected via (or through) the second data communication line 410, and the main processor 121 and the first sub-processor 122 may be connected via (or through) the second power control line 420, and the control signal for switching the washing machine 100 to the standby mode may be transmitted from the first sub-processor 122 to the main processor 121 via (or through) the second power control line 420.

Connection of the data communication line and the power control line will be described in detail with reference to FIG. 4.

The washing machine 100 may include the upper washing machine and the lower washing machine, and the first sub-processor may be included in one of the upper washing machine and the lower washing machine, and the second sub-processor 123, 223 and the main processors 121, 221 may be included in each of the upper washing machine and the lower washing machine, respectively.

The first sub-processor 122 may identify whether the operation corresponding to the control word included in the user voice is executable when the power of the washing machine 100 is off, and if the operation is identified as being executable in the power-off state, the first sub-processor 122 may transmit a control signal for executing an operation corresponding to the control word to at least one of the second sub-processors 123 and 223 and the main processors 121 and 221 included in the upper washing machine and the lower washing machine, respectively.

When it is identified that the operation is not executable in the power-off state, the first sub-processor 122 may transmit, to at least one of the second sub-processors 123, 223, and the main processors 121, 221 included in each of the upper washing machine and the lower washing machine, a control signal for switching the washing machine 100 to a power-on state.

A detailed description regarding the upper washing machine and the lower washing machine will be described with reference to FIG. 8.

Although each of the second sub-processors 123 and 223 and the main processors 121 and 221 may be included in the upper washing machine and the lower washing machine, the first sub-processor 122 may include only one. The first sub-processor 122 serves to analyze the user voice, and thus, the first sub-processor 122 does not have to be separately configured in the upper washing machine and the lower washing machine in the same space. The upper washing machine and the lower washing machine may include separate second sub-processors 123 and 223 and main processors 121 and 221, respectively, but the first sub-processor 122 may be configured as only one.

In describing the washing machine 100, it can be described that analyzing voice data may be performed by the main processor 120, but in actual implementation, the voice recognition and voice data analysis function may be performed by the first sub-processor 122 as well.

The washing machine 100 may separately control a plurality of processors through the above-described configuration. The display 102 included in the washing machine 100 may be separately controlled to efficiently manage power. When the washing machine 100 is in a power saving mode, the display 102 may be also placed in a power saving state, and the state of the display 102 may be switched from a power saving state to a normal state only if necessary by analyzing the user voice. A process of changing the power saving state to the normal state uses a separate power control line instead of a data communication line, power consumption can be reduced.

Figure 2:
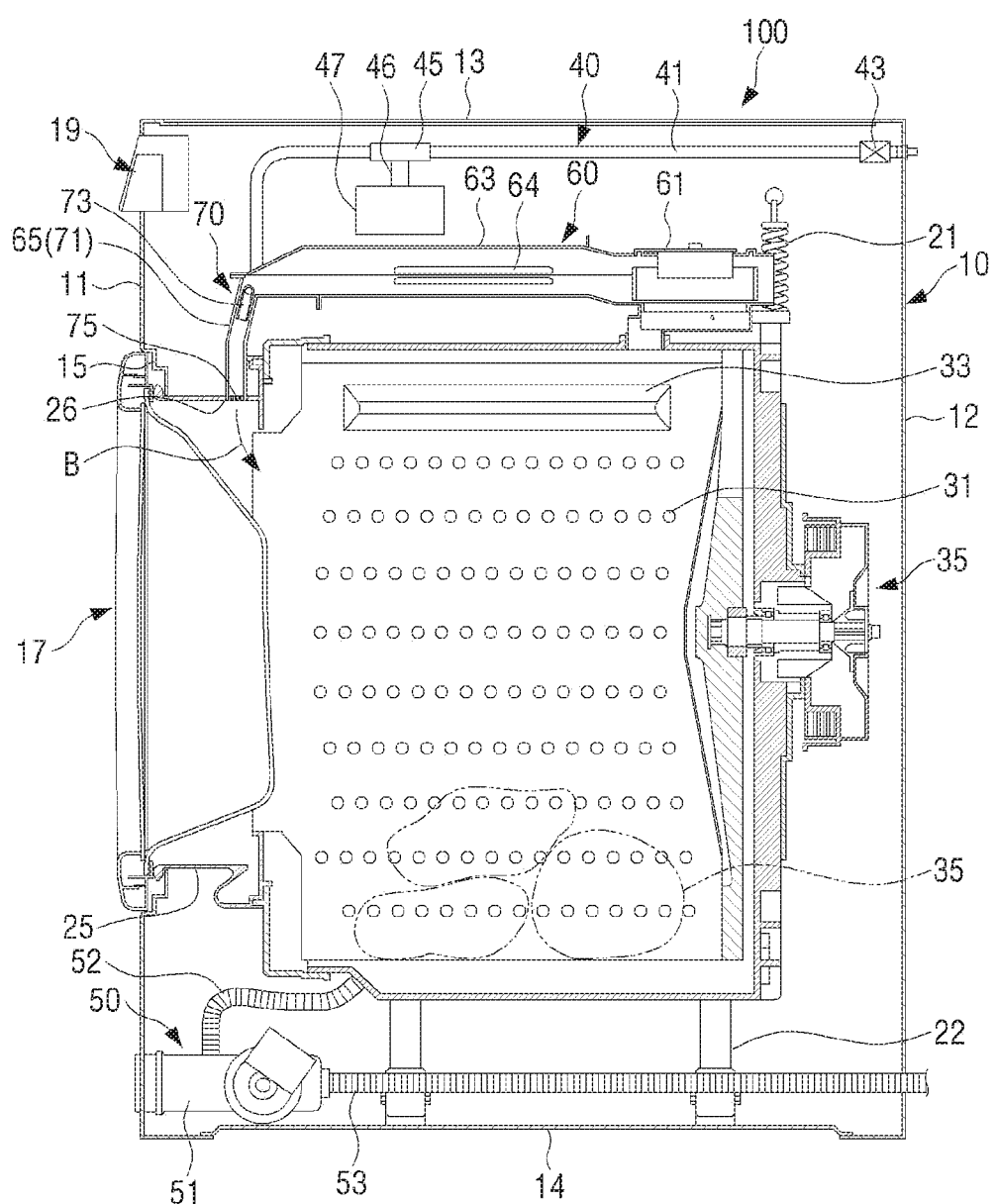
FIG. 2 is a cross-sectional diagram illustrating a washing machine according to an embodiment.

FIG. 2 is a cross-sectional diagram illustrating a washing machine according to an embodiment.

Figure 3:
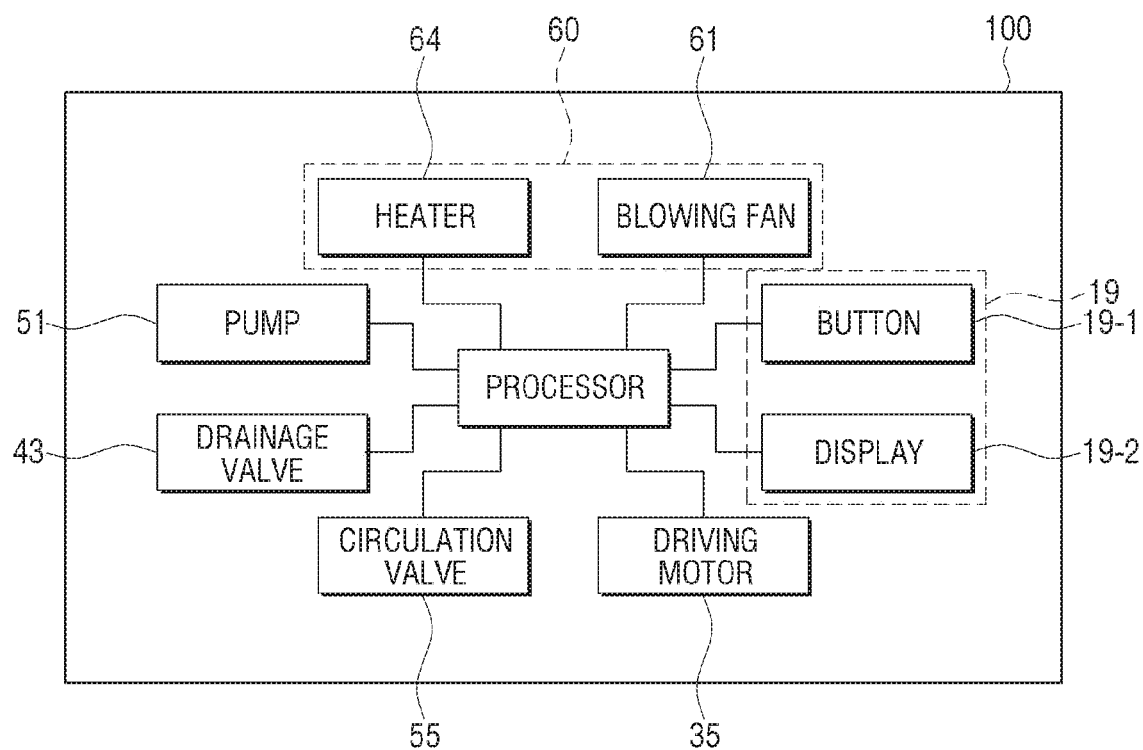
FIG. 3 is a block diagram illustrating a washing machine according to an embodiment.

FIG. 3 is a function block diagram illustrating a washing machine according to an embodiment.

Referring to FIGS. 2 and 3, the washing machine 100 according to an embodiment includes a main body 10, a tub 20, a drum 30, a dryer 60, and a bubble generator 70.

The main body 10 forms an outer appearance of the washing machine 100 and may have a rectangular parallelepiped. The main body 10 may include a front frame 11, a back frame 12, a left frame, a right frame, an upper frame 13, and a lower frame 14.

The front frame 11 of the main body 10 is provided with a laundry inlet 15 for putting laundry into and out of the main body 10. A door 17 that can be opened and closed is installed in the laundry inlet 15. A control panel 19 for controlling the washing machine 100 may be provided on an upper portion of the front frame 11 of the main body 10. The control panel 19 may include a plurality of buttons 19-1 for controlling the washing machine 100, a display 19-2 for displaying information related to the washing machine 100 and the washing process, and a processor for controlling the washing machine.

The tub 20 is installed in the main body 10 of the washing machine 100, and is formed in a hollow cylindrical shape having an opening toward the laundry inlet 15 of the front frame 11. The tub 20 may store a predetermined amount of water needed for washing. The tub 20 is supported and fixed to the inner surface of the main body 10 by means of an extension spring 21, an oil damper 22, and the like.

A diaphragm 25 may be provided between the tub 20 and the front frame 11 of the body 10. The diaphragm 25 is formed in a generally annular shape. One end of the diaphragm 25 is fixed to one end of the tub 20 having an opening, and the other end of the diaphragm 25 is fixed to an inner circumference of the laundry inlet 15 of the front frame 11. The diaphragm 25 prevents water contained in the tub 20 from leaking to the outside of the tub 20 and forms a passage through which laundry passes. The diaphragm 25 blocks vibration generated when the drum 30 is rotated, through the tub 20 to the front frame 11 of the main body 10.

The drum 30 is rotatably installed in the tub 20 and has a generally hollow cylindrical shape. A front surface of the drum 30 is provided with an opening corresponding to the laundry inlet 15 of the washing machine body 10. A plurality of through-holes 31 through which water may pass are provided on the outer circumferential surface of the drum 30. A plurality of lifts 33 for raising the laundry 35 are provided on the inner surface of the drum 30. The drum 30 may be rotated about a horizontal axis by a driving device including a driving motor 35 installed on a rear surface of the drum 30.

In the upper part of the tub 20, a water supply device 40 for supplying water to the tub 20 is provided, and in the lower part of the tub 20, a water drainage device 50 for draining water from the tub 20 is provided.

The water supply device 40 includes a water supply pipe 41 connected to an external water supply source (not shown) and a water supply valve 43 for opening and closing the water supply pipe 41. An end of the water supply pipe 41 is connected to the bubble generator 70 to e described below. The water supply pipe 41 is provided with a detergent suction unit 45.

The detergent suction unit 45 is formed of a venturi pipe, and a detergent pipe 46 connected to a detergent supply unit 47 is provided at an intermediate portion thereof. When the water supply valve 43 is opened and water is supplied to the water supply pipe 41, the detergent of the detergent supply unit 47 is mixed with water and dissolved by the venturi effect in the detergent suction unit 45. Thus, the water mixed with the detergent is supplied to the bubble generator 70 through the water supply pipe 41. In the following description, the water in which the detergent is mixed is referred to as the wash liquid.

The water drainage device 50 may include a pump 51, a first drain pipe 52, and a second drain pipe 53. A pump 51 draws water in the tub 20. One end of the first drain pipe 52 is connected to the lower portion of the tub 20, and the other end of the first drain pipe 52 is connected to the pump 51 to guide the water of the tub 20 to the pump 51. One end of the second drain pipe 53 is connected to the pump 51, and the other end of the second drain pipe 53 is extended to the outside of the main body 10 to discharge the water of the tub 20 to the outside. Accordingly, when the pump 51 is operated, the water of the tub 20 is discharged to the outside of the washing machine 100 through the first drain pipe 52 and the second drain pipe 53.

At an upper side of the tub 20, the drier 60 for drying the laundry 35 washed by the drum 30 may be installed.

Figure 4:
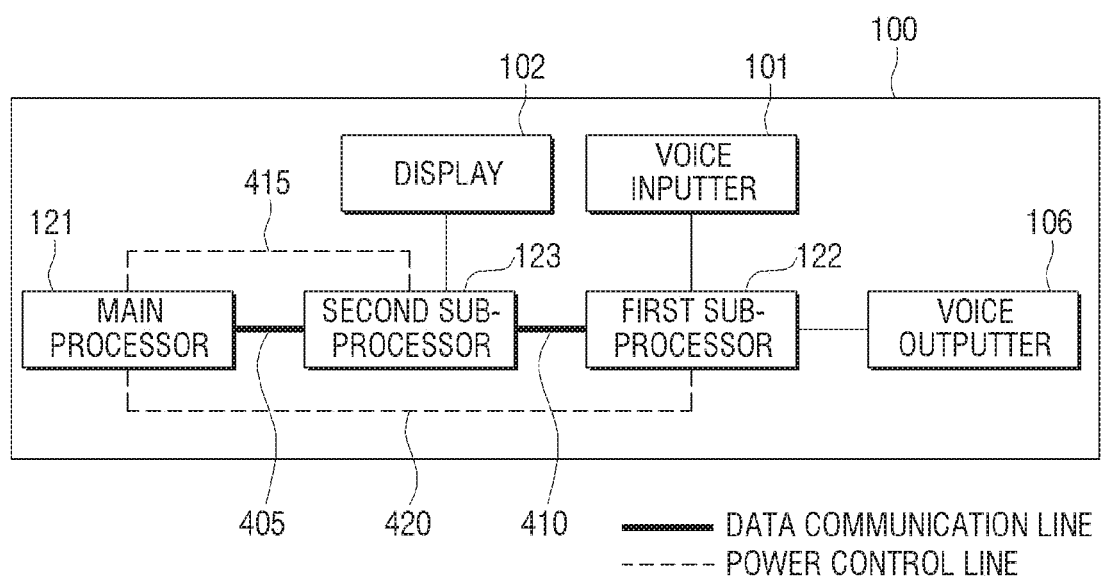
FIG. 4 is a diagram illustrating a signal transmission process of a washing machine according to an embodiment.

FIG. 4 is a diagram illustrating a signal transmission process of a washing machine according to an embodiment.

The washing machine 100 may include the voice inputter 101, the display 102, the first sub-processor 122, the second sub-processor 123, the main processor 121, and a voice outputter 106.

The voice inputter 101, the display 102, the first sub-processor 122, the second sub-processor 123, and the main processor 121 have been described above and will not be further described.

The voice outputter 106 is a module outputting sound such as a speaker. The voice outputter 106 may output voice data transmitted from any one of the first sub-processor 122, the second sub-processor 123, and the main processor 121 as a sound.

The washing machine 100 may separately set the lines connecting each processor 121-123 separately.

The main processor 121 may control overall operations of the washing machine 100. The second sub-processor 123 may control the power of the display connected to the washing machine 100 and control the screen and contents on the display, and may receive a user voice through the voice inputter. The first sub-processor 122 may switch the user voice received through the voice inputter into a digital signal, and transmit the corresponding content to the second sub-processor 123 and the main processor 121. The second sub-processor 123 may transmit voice data received from the main processor 121 to a voice outputter. The voice outputter may output voice data to a sound by a control command of the first sub-processor 122.

It is assumed that the washing machine 100 is in the power saving state in which power is off. When the user utters "Bixby," the washing machine 100 may recognize the wake-up word "Bixby," to switch from the power saving mode to the standby mode. In this example, the voice inputter may receive "Bixby" as a voice signal and the first sub-processor 122 may switch the voice signal to a digital signal.

The first sub-processor 122 and the main processor 121 are connected via a power control line, and the main processor 121 may be connected to the second sub-processor 123 via the power control line. The power control line is not capable of transmitting and receiving data, but is capable of recognizing whether a voltage has been applied. Accordingly, when the first sub-processor 122 applies the predetermined voltage to the first sub-processor 122 by a predetermined time through the power control line, the main processor 121 may control the power saving mode to switch from the power saving mode to the standby mode. In this example, the main processor 121 may control the second sub-processor 123 to switch from the power saving mode to the standby mode by applying a predetermined voltage to the second sub-processor 123 by a predetermined time.

In this example, referring to FIG. 4, the main processor 121 may be connected to the second sub-processor 123 via the data communication line, and the second sub-processor 123 may be connected to the first sub-processor 122 via the data communication line. The data communication line may be a connection line for a method of transmitting and receiving data bi-directionally.

After both the main processor 121 and the second sub-processor 123 are switched from the power saving mode to the standby mode, the first sub-processor 122 may transmit a digital signal corresponding to the user voice to the second sub-processor 123 and the main processor 121.

Referring to FIG. 4, the digital signal corresponding to the user voice switched through the first sub-processor 122 may be transmitted to the second sub-processor 123, and in this case, the second sub-processor 123 may display a content corresponding to the user voice on the display. The digital signal corresponding to the user voice may be transmitted to the main processor 121. The main processor 121 may control so that an operation corresponding to the control word included in the user voice may be executed.

For example, the main processor 121 may determine to output voice data "turn on the power of the washing machine." The main processor 121 may transmit the voice data to the second sub-processor 123, and the second sub-processor 123 may transmit voice data to the first sub-processor 122. Using the voice outputter, the first sub-processor 122 may output voice data "turn on the power of the washing machine."

With reference to FIG. 4, the main processor 121 and the second sub-processor 123 are described as separate processors, but in actual implementation, the processors may operate as one processor.

In illustrating FIG. 4, the main processor may analyze a user voice, but the first sub-processor may analyze the user voice. When the first sub-processor analyzes a user voice, data may be transmitted to the main processor only when necessary, and a control signal may be transmitted so that an operation which may be processed by the first sub-processor itself may be executed by the voice outputter or the second sub-processor without using the main processor.

The main processor 121 and the second sub-processor 123 may be connected via the first data communication line 405 and the first power control line 415, the first sub-processor 122 and the second sub-processor 123 may be connected via the second data communication line 410, and the main processor 121 and the first sub-processor 122 may be connected via the second power control line 420, and the control signal for switching the washing machine 100 to the standby mode may be transmitted from the first sub-processor 122 to the main processor 121 via the second power control line 420.

For example, the current state of the washing machine 100 is powered off and is in a power saving mode. When the washing machine 100 is in a power saving mode, the first sub-processor 122 may be in a normal state and may be in a normal operational state with the performance not being limited. When the washing machine 100 is in a power saving mode, the second sub-processor 123 and the main processor 121, and the display 102 may be in a power saving state and performance may be limited.

If the user attempts to use the washing machine 100 using the voice recognition function, the user must utter a word using the wake-up word and the control word. If the wake-up word is included in the user voice, the washing machine 100 may be switched from the power saving mode to the standby mode. Switching the washing machine 100 to the standby mode may mean to switch to a state that does not limit the performance of some of the components of the washing machine 100 as described above.

Accordingly, it is necessary to switch the state of some of the components of the washing machine 100 with only the user's wake-up word. In example, a data communication line and a power control line for transmitting and receiving data may be used. The washing machine 100 is in a power saving mode and may not use a data communication line when the component is in a power saving state. Therefore, it is generally necessary to keep a particular processor in a normal state rather than a power saving state at all times to release the power saving mode.

In order to solve this problem, a power control line is additionally arranged in addition to a data communication line. The first sub-processor 122 may transmit the first control signal to the main processor 121 to switch the display from a power saving state to a normal state. The main processor 121 receiving the first control signal may switch from the power saving state to the normal state and transmit the second control signal back to the second sub-processor 123. The second sub-processor 123, which has received the second control signal, may switch from the power saving state to the normal state. The second sub-processor 123, which is switched to the normal state, can control the display device to be switched from the power saving state to the normal state.

If the user utters a wake-up word, the operation of switching the power saving state of the main processor 121, the second sub-processor 123, and the display 102 which are in the power saving state to the normal state may be implemented by using only a power control line.

The first data communication line 405 and the second data communication line 410 may be used for the process of recognizing the control word of the user when the washing machine 100 is in a standby mode. When the first sub-processor 122 receives the voice of the user received through the voice inputter 101, the user voice data may be transmitted to the second sub-processor 123 using the second data communication line. The second sub-processor 123 may transmit user voice data to the main processor 121 using the first data communication line. In this example, the main processor 121 may analyze the received user voice data to identify whether a control word is included.

The main processor 121 may identify whether a control word included in the user voice corresponds to information stored in a memory (not shown) and control so that an operation corresponding to the control word may be executed.

A content of executing an operation corresponding to the control word may be displayed on a display. In this example, the control command may be transmitted from the main processor 121 to the second sub-processor 123 using the first data communication line 405. The second sub-processor 123 may control the display 102 to display a content that an operation corresponding to the control word is executed on the display 102.

Executing an operation corresponding to the control word may be output through the voice outputter 106 as a voice. In this example, the main processor 121 may transmit a control command to the second sub-processor 123 using the first data communication line 405, and the second sub-processor 123 may transmit the control command to the first sub-processor 122 controlling the voice module. The first sub-processor 122 may control the voice outputter 106 to output the received control command to the sound through the voice outputter 106 as a voice.

With reference to FIG. 4, it has been described that the display 102 and the voice outputter 106 are controlled, but various hardware may be controlled using a same method.

With reference to FIG. 4, a component of the washing machine 100 may be controlled by separately connecting the data communication line and the power control line, in addition to the configuration illustrated in FIG. 4.

In describing the washing machine 100, it has been described that analyzing the voice data is performed by the main processor 121. However, this is merely exemplary, and the voice recognition and voice data analysis functions may be performed by the first sub-processor 122.

Figure 5:
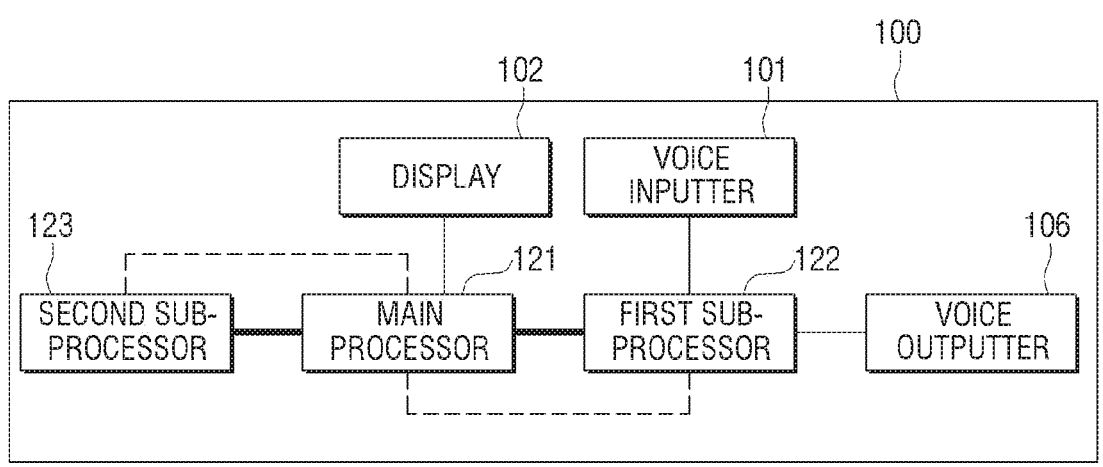
FIG. 5 is a diagram illustrating a signal transmission process of a washing machine according to a still another embodiment.

FIG. 5 is a diagram illustrating a signal transmission process of a washing machine according to a still another embodiment.

Referring to FIG. 4, the main processor 121, the second sub-processor 123, and the first sub-processor 122 are disposed in order, but referring to FIG. 5, the washing machine according to another embodiment may be disposed in order of the second sub-processor 123, the main processor 121, and the first sub-processor 122.

Referring to FIG. 5, only the movement order of the data using the data communication line is different, and the mode of switching from the power saving mode to the standby mode is the same. In the embodiment referring to FIG. 5, when the first sub-processor 122 applies a predetermined voltage to the first sub-processor 122 by a predetermined time through the power control line, the main processor 121 may control the above and control to switch from the power saving mode to the standby mode. In this example, the main processor 121 may control the second sub-processor 123 to switch from the power saving mode to the standby mode by applying a predetermined voltage to the second sub-processor 123 by a predetermined time.

Both the main processor 121 and the second sub-processor 123 are switched from the power saving mode to the standby mode through the power control line, the first sub-processor 122 may transmit a digital signal corresponding to the user voice to the second sub-processor 123 and the main processor 121.

Referring to FIG. 5, the first sub-processor 122 may transmit the received user voice data to the main processor 121, and the main processor 121 may control the main processor 121 to execute an operation corresponding to the control word included in the user voice. The main processor 121 may transmit the voice data which is a digital signal corresponding to the user voice to the second sub-processor 123, and in this example, the second sub-processor 123 may display contents corresponding to the user voice on the display.

It is assumed that the main processor 121 determines to output voice data "turn on the power of the washing machine." The main processor 121 may transmit the voice data to the first sub-processor 122. The first sub-processor 122, using the voice outputter, may output voice data of "turn on the power of the washing machine."

In describing FIG. 5, the main processor 121 and the second sub-processor 123 are described as separate processors, but in actual implementation, the processors may operate as one processor.

FIG. 6 is a diagram illustrating a voice recognition function of a washing machine according to an embodiment.

If the control word associated with the operation of the washing machine 100 is input through the voice inputter 101, the washing machine 100 may execute an operation corresponding to the control word of the user.

For example, referring to embodiment 605, if the user utters a voice including a control word "standard washing," the washing machine 100 may execute an operation corresponding to the standard washing.

Referring to embodiment 610, a user may use a voice recognition function, even with respect to the details of the washing process. For example, if a user utters a voice including the content "set up the temperature of water to 60 degrees," the washing machine 100 may set the water temperature to 60 degrees. If the current washing is in progress, the temperature of water in the currently proceeding washing mode may be set to 60 degrees. If the current washing is not in progress, the washing machine 100 may not respond to the user's utterance. In addition, if the current washing is not in progress, the washing machine 100 may set the temperature of the water to 60 degrees based on the washing mode input within a predetermined period of time.

The user may utter a control word including both the washing process and the detailed setting. For example, referring to embodiment 620, if the user utters a voice to add a rinsing function once more in the standard washing, the washing machine 100 may execute an operation corresponding to the standard washing by adding one time to the number of rinsing which has been set before.

Referring to embodiment 630, the user may set the particular function and operating time of the washing machine 100 together. For example, if the user utters the voice "please set tub drying (or drum drying) for 20 minutes," the washing machine 100 may control the tub drying function to be performed for 20 minutes. Here, the tub drying function may be stored with a predetermined time value. If the user has determined that the "please do the tub drying," it is possible to perform the tub drying function by a predetermined time value (e.g., ten minutes). However, the washing machine 100 may change the time value from a predetermined time value (e.g., ten minutes) of the tub drying function to 20 minutes when a control command of 20 minutes and the tub drying function is uttered, as in embodiment 630.

FIG. 7 is a diagram illustrating a voice recognition function of a washing machine according to another embodiment.

The user may change the detailed setting of the washing machine 100 through a voice recognition function.

Referring to embodiment 705, if the user utters "please turn off an alarm," the washing machine 100 may control to remove the alarm.

Referring to embodiment 710, the user may turn off or turn on light entering the display or the manipulation input panel through the voice recognition function. If the user utters "please turn on light," the washing machine 100 may provide power of light so that the light is in the power-on state.

The user may request specific information to the washing machine 100.

Referring to embodiment 715, the user may request information related to the current state of the washing machine 100. If the user voice includes a word "current state," the washing machine may output information on the current state of the washing machine 100. The outputting method may include displaying information on the display or outputting sound using a voice outputter.

Referring to embodiment 720, the user may request specific information during the operation of the washing machine 100. For example, the user may request information on a washing process which is being proceeded. When the user utters "please let me know a remaining washing time, the washing machine 100 may output information on the remaining washing time among information on the washing processor which is being processed.

FIG. 8 is a diagram illustrating a voice recognition function of a washing machine according to another embodiment.

Referring to embodiment 805, if the user specifies and utters a type of laundry, the washing machine 100 may recommend a washing mode corresponding to the type of the laundry.

Referring to embodiment 810, if a user asks what is a specific washing mode, the washing machine 100 may output predetermined information on the specific washing mode uttered by the user.

The user may ask whether the washing machine 100 has an error and a solution thereof using the voice recognition function.

Referring to embodiment 815, the washing machine 100 may not be normally used due to a stop of the washing machine 100 during using or an unknown error. In this example, error information may be generally displayed on a display. The user may ask about the error, and the washing machine 100 may output a description of the currently identified error information and a solution thereof together.

Referring to embodiment 820, if the user asks about a specific operation, the washing machine 100 may identify whether the operation may be executable. The washing machine 100 may output a reason why the specific operation asked by the user is not executable.

FIG. 9 is a diagram illustrating a voice recognition function of a washing machine according to another embodiment.

Referring to embodiment 905, when the user utters a washing mode and whether to proceed with a washing mode, the washing machine 100 may execute an operation corresponding to a user voice. For example, when the user utters "please start with a standard washing course," the washing machine 100 may control to start the standard washing course.

Referring to embodiment 910, when the user utters "turbo washing" only and does not mention whether to proceed washing, the washing machine 100 may set the washing course to turbo washing, but may wait without starting washing.

The user may modify detailed setting of the washing mode.

Referring to embodiment 915, the user may set the temperature of the water in a standard washing mode. For example, it is assumed that in a standard washing mode, the temperature of water is set to 40 degrees. When the user utters to set the temperature of the water to 60 degrees in the standard washing mode, the washing machine 100 may change the temperature of the water in a standard washing mode to a default value of 40 degrees to 60 degrees.

Referring to embodiment 920, the user may change the number of rinsing function in the turbo washing mode. For example, it is assumed that the number of rinsing in the turbo washing mode is basically set to two times. When the user utters to add the number of rinsing by three times in the turbo mode, the washing machine 100 may change the number of rinsing from two times to a total of five times in the turbo washing mode.

FIG. 10 is a diagram illustrating a voice recognition function of a washing machine according to another embodiment.

The user may identify and solve an error of the washing machine 100 using the voice recognition function.

Referring to embodiment 1005, the user may ask error information of the washing machine 100, and the washing machine 100 may output a problem and a solution thereof.

Referring to embodiment 1010, the user may ask a specific defect, and the washing machine 100 may output a cause and a solution of the detect.

The user may specify the laundry and recommend a specific washing mode.

Referring to embodiment 1015, if the user utters a word indicating a laundry such as a blue jean, a towel, or the like, the washing machine 100 may recommend a washing mode suitable for the corresponding laundry. If there is a prestored caution, the washing machine 100 may output the caution.

Referring to embodiment 1020, if washing modes suitable for two types of laundry mentioned by the user are different from each other, the washing machine 100 may recommend different washing modes.

In the embodiment of FIGS. 6 to 10, it is illustrated that the washing machine 100 outputs a sound through the voice outputter, but in actual implementation, it may be displayed on the display.

In the embodiment of FIGS. 6 to 10, the washing machine 100 may identify whether an operation corresponding to the control word included in the user voice is executable when the power of the washing machine 100 is off, before executing an operation corresponding to the user voice.

The washing machine 100 may immediately perform an operation if an operation corresponding to a control word included in the user voice is executable while the washing machine 100 is turned off. The washing machine 100 may switch the washing machine 100 to a power-on state and perform an operation corresponding to the control word if the operation corresponding to the control word included in the user voice is not executable while the washing machine 100 is turned off.

Embodiments 705, 715, 720, 815, 820, 1005, and 1010 may indicate that the power of the washing machine 100 is turned off. In these embodiments, the washing machine 100 may execute an operation corresponding to the user voice directly without a separate determination process.

Embodiments 605, 610, 620, 630, 905, 910, 915, and 920 may mean the case where execution is available only when the power of the washing machine 100 is turned on. In the embodiments, the washing machine 100 may identify whether an operation corresponding to a control word included in the user voice is executable in the powered-off state of the washing machine 100. The conferencing machine 100 may identify whether to keep the power of the washing machine 100 off or turn on. If it is identified that the operation corresponding to the control word included in the user voice is not executable in the power-off state, the washing machine 100 may switch the washing machine 100 to a power-on state and execute an operation corresponding to the control word.

Embodiments 805, 810, 910, 1015, and 1020 may indicate that the execution is available even if the power of the washing machine 100 is not turned on. In the embodiments, if it is identified that the operation corresponding to the control word included in the user voice is executable in the power-off state, the washing machine 100 may execution an operation corresponding to the control word in the standby mode.

FIG. 11(a)~(b) is a diagram illustrating a washing machine in which an upper washing machine and a lower washing machine are combined.

The washing machine 100 may include an upper washing machine 1105 and a lower washing machine 1110. The upper washing machine 1105 and the lower washing machine 1110 may be separate washing machines performing a washing function and a space thereof may be separate. The upper washing machine 1105 and the lower washing machine 1110 may have different capacity for processing the laundry, and a function thereof may be different too.

For example, the upper washing machine 1105 may operate in a fully automatic manner and may handle a small amount of laundry. The lower washing machine 1110 may operate as a drum type and may handle a large amount of laundry.

The upper washing machine 1105 and the lower washing machine 1110 may each include a separate processor, a manipulation input panel, and a display. However, the voice inputter 101 of the upper washing machine 1105 may be the same as the lower washing machine 1110. Since the upper washing machine 1105 and the lower washing machine 1110 are in the same space, there is no need to have a separate voice inputter. Thus, although the configuration for each operation may exist separately, the voice inputter may be included only on one side of the upper washing machine 1105 or the lower washing machine 1110.

The main processor 121 may identify a device to execute an operation corresponding to a control word of the upper washing machine 1105 and the lower washing machine 1110 based on the identification information of the washing machine 100 included in the user voice. The main processor 121 may control the upper washing machine 1105 to operate if the user utters "Bixby, please start the standard washing at the upper washing machine 1105." The identification information of the washing machine 100 may be a word "upper washing machine 1105." The identification information may be a word representing the upper washing machine 1105 or the lower washing machine 1110, and may be added and modified according to the user's setting.

The washing machine 100 may include the upper washing machine 1105 and the lower washing machine 1110, and the main processor 121 may switch both the upper washing machine 1105 and the lower washing machine 1110 to a power-on state if the identification information of the washing machine 100 is not included in the user voice. For example, if the user has uttered the voice "Bixby, please power on," the main processor 121 may control to switch the power of both the upper washing machine 1105 and the lower washing machine 1110 to the power-on state because the user has not specified any one of the upper washing machine 1105 and the lower washing machine 1110.

If the user utters "Bixby, please start a standard washing," it may be confusing if the upper washing machine 1105 or the lower washing machine 1110 should run. In this example, the main processor 121 may switch the power of both the upper washing machine 1105 and the lower washing machine 1110 to a power-on state and may identify a location where the laundry is contained. If the main processor 121 identifies that the laundry is contained in the upper washing machine 1105, the main processor 121 may control to automatically start standard washing in the upper washing machine 1105. Further, if the main processor 121 identifies that the laundry is contained in the lower washing machine 1110, the main processor 121 may control to automatically start standard washing in the lower washing machine 1110.

The washing machine 100 may include the upper washing machine 1105 and the lower washing machine 1110, and the main processor 121 may switch the lower washing machine 1110 to a power-on state if the identification information of the washing machine 100 is not included in the user voice, and may perform an operation corresponding to the control word in the lower washing machine 1110. For example, if the user has uttered the voice "Bixby, please power on," any one of the upper washing machine 1105 and the lower washing machine 1110 has not been specified and thus, the main processor 121 may set a priority to the lower washing machine 1110 to switch the lower washing machine to 1110 to a power-on state, and perform an operation corresponding to the control word in the lower washing machine 1110.

In the above description, a priority is set to the lower washing machine 1110, but in actual implementation, the priority may be set to the upper washing machine 1105 to switch the upper washing machine 1105 to the power-on state and execute an operation corresponding to the control word in the upper washing machine 1105.

The main processor 121 may store an operation pattern of the user in the memory, and may set a priority to the washing machine to be used most frequently for a predetermined period of time. For example, if the user uses the upper washing machine 1105 three times for one month, and use the lower washing machine 1110 ten times, the priority may be set to the lower washing machine 1110.

Referring to FIG. 11B, the washing machine 100 may be divided into the upper washing machine 1105 and the lower washing machine 1110. Although the washing machine 100 comprises separate second sub-processors 123 and 223 and main processors 121 and 221, respectively, the first sub-processor 122 may include only one processor. There is no need for a plurality of voice recognition modules to be present in the same space.

The first sub-processor 122 may transmit a control signal or data to separate second sub-processors 122, 223 and the main processors 121, 221.

It is assumed that the voice recognition function is performed in the main processor 121. As another embodiment to be described below, if a voice recognition function is performed in the first sub-processor 122 to identify a control word included in the user voice, voice data may be transmitted to only one of the upper washing machine 1105 and the lower washing machine 1110.

If the main processor 121 and 221 performs a voice recognition function, voice data needs to be transmitted to both the separate upper washing machine 1105 and the lower washing machine 1110. The main processors 121 and 221 need to analyze the voice data to identify whether the information corresponding to the device is included.

For example, if the user utters "Start standard washing at the upper washing machine," the voice data may be received via the voice inputter 101. The first sub-processor 122 may transmit voice data to the main processors 121 and 221 of the upper washing machine 1105 and the lower washing machine 1110 using data communication line. Each of the main processors 121 and 221 may analyze the voice data to identify whether it is a command issued to own device. In this example, since the user utters "start standard washing at the upper washing machine," only the main processor 121 of the upper washing machine 1105 may give a control command in response thereto. The main processor 221 of the lower washing machine 1110 may identify that it is not a command issued to own device and may not do any reaction.

With reference to FIG. 8, in describing the washing machine 100, it is described that the main processor 121 performs analysis of the voice data. However, this is only one embodiment, and voice recognition and voice data analysis functions may be performed in the first sub-processor 122.

The first sub-processor 122 may transmit information or transmit control signals to only the second sub-processor 123 and the main processor 121 to control only the upper washing machine 1105. For example, if the user gives the command "please start standard washing at the upper washing machine," the first sub-processor 122 may transmit the corresponding voice data only to the upper washing machine 1105.

Conversely, to control only the lower washing machine 1110, the information or a control signal may be transmitted to only the second sub-processor 223 and the main processor 221.

In order to control both the upper washing machine 1105 and the lower washing machine 1110, information or a control signal may be transmitted to the second sub-processors 123 and 223 and the main processors 121 and 221.

Figure 12:
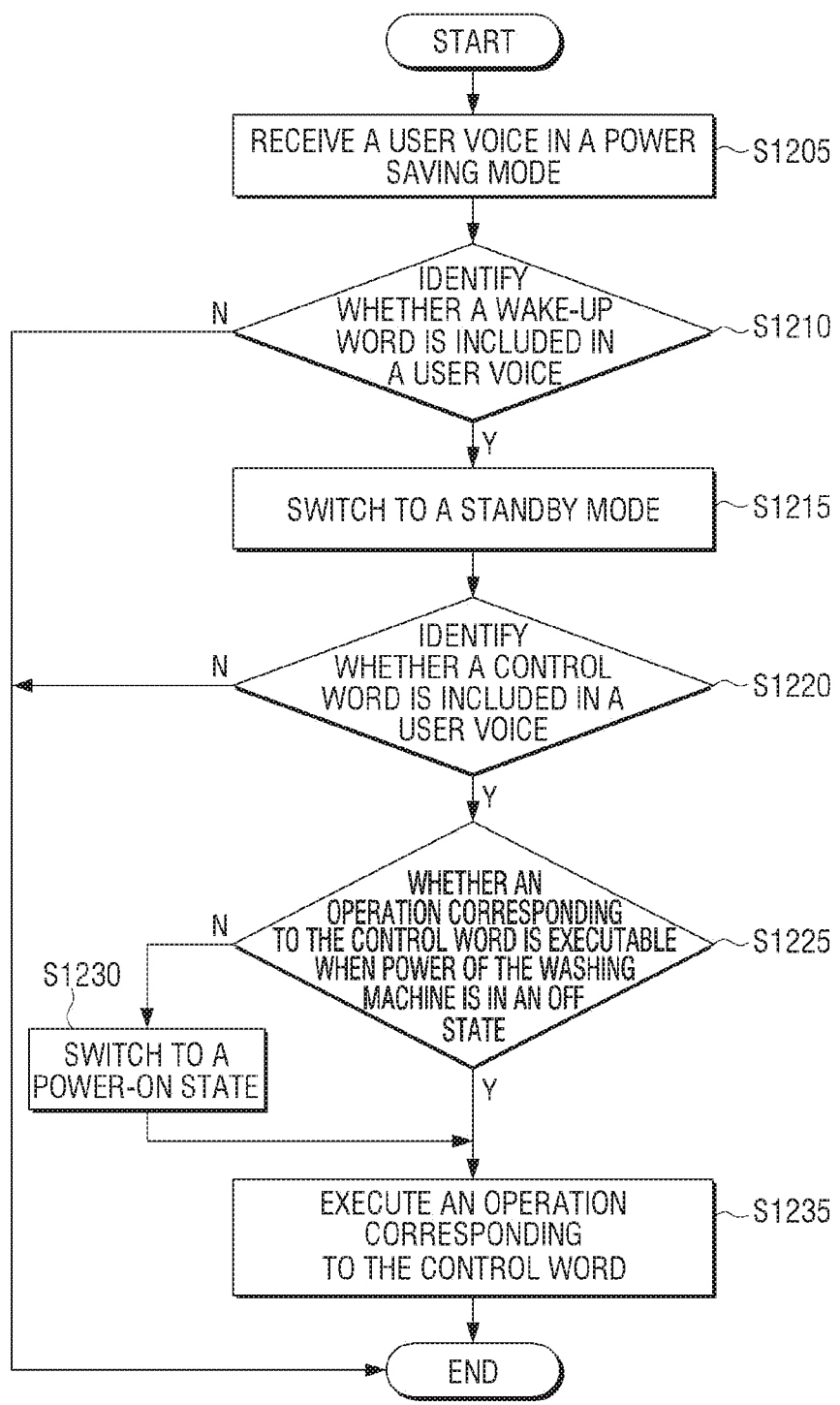
FIG. 12 is a diagram illustrating a control method of a washing machine according to an embodiment.

FIG. 12 is a sequence diagram illustrating a control method of a washing machine according to an embodiment.

The washing machine 100 may receive a user voice in a power saving mode in operation S1205. The washing machine 100 may identify whether a wake-up word is included in the user voice in operation S1210. If the user does not have a wake-up word in the uttered voice, the washing machine 100 may not respond to user voice. If the voice uttered by the user includes the wake-up word, the washing machine 100 may switch from the current power saving mode state to the standby mode state in operation S1215.

The washing machine 100 may identify whether a control word is included in the user voice in operation S1220. If the control word is not included in the user voice, the washing machine 100 may not respond to user voice in the current standby mode state. If a control word is included in the voice uttered by the user, whether the operation corresponding to the control word may be executed in a state where the power of the washing machine is in an off state (standby mode) may be determined in operation S1225.

If the operation corresponding to the control word is not executable in the power-off state (or standby mode) of the washing machine, the washing machine 100 may switch to a power-on state (or an operation mode) in operation S1230. The washing machine 100 may perform an operation corresponding to a control word in the operation mode in operation S1235.

If the operation corresponding to the control word is executable in the power-off state (or operation mode) of the washing machine, the washing machine 100 may execute an operation corresponding to the control word while maintaining the current state (or operation mode) in operation S1235.

Figure 13:
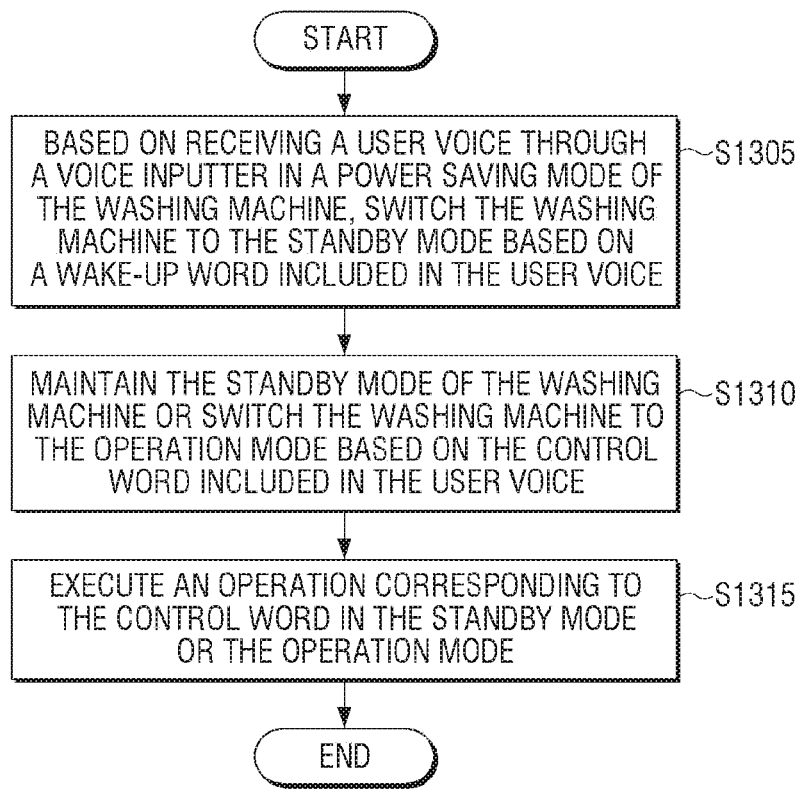
FIG. 13 is a flowchart illustrating a control method of a washing machine according to an embodiment.

FIG. 13 is a flowchart illustrating a control method of a washing machine according to an embodiment.

The control method of the washing machine 100 according to an embodiment may include, based on receiving a user voice through the voice inputter 101 in the power saving mode of the washing machine 100, switching to a standby mode of the washing machine 100 based on a wake-up word included in a user voice in operation S1305.

The waiting mode of the washing machine 100 may be maintained or the washing machine 100 may be switched to an operation mode based on a control word included in the user voice in operation S1310. An operation corresponding to the control word may be executed in a standby mode or an operation mode in operation S1315.

The step of executing an operation corresponding to the control word in operation S1315 may include identifying whether the operation corresponding to the control word is executable in the standby mode, and if the operation is identified as being executable in the standby mode, executing an operation corresponding to the control word in the standby mode, and if the operation is identified as being not executable in the standby mode, switching the washing machine 100 to the operation mode and executing the operation corresponding to the control word.

The executing an operation corresponding to the control word in operation S1315 may include, based on the control word including at least one of the word associated with the state of the washing machine 100 and the word associated with the washing process recommendation, identifying that the operation corresponding to the control word is executable in the standby mode.

The power saving mode and the standby mode may refer that only a power button among at least one button provided in the washing machine 100 is activated, and the operation mode may refer that at least one button other than the power button is activated.

The executing an operation corresponding to the control word in operation S1315 may include switching the standby mode into the operation mode when the word related to the washing process and a detailed option of the washing process are included in the user voice, and proceeding the washing process based on the detailed option.

Figure 14:
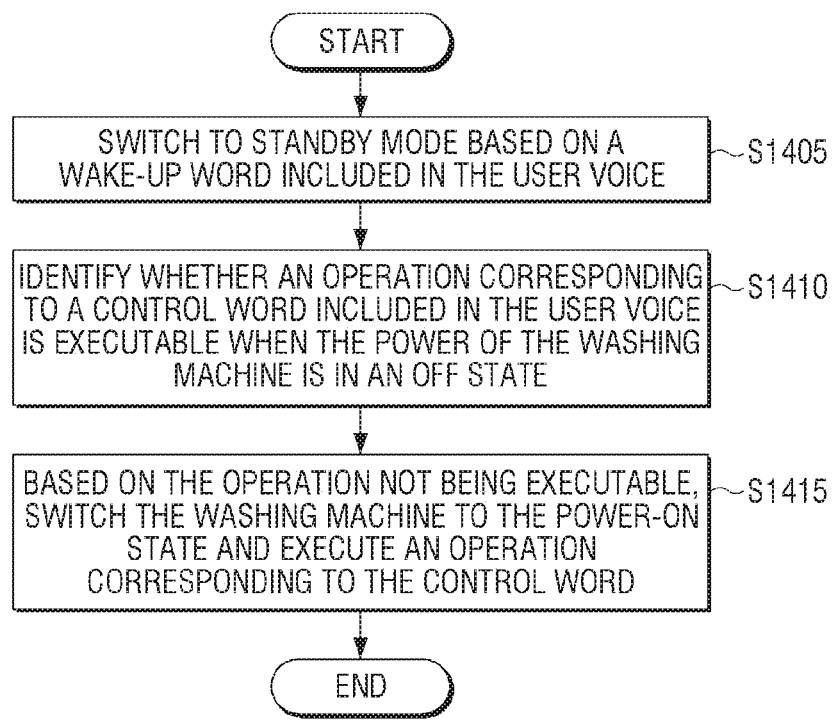
FIG. 14 is a flowchart illustrating a control method of a washing machine according to another embodiment.

FIG. 14 is a flowchart illustrating a control method of a washing machine according to another embodiment.

Referring to FIG. 14, a control method of the washing machine 100 according to an embodiment may include switching to a standby mode based on a wake-up word included in a user voice when a user voice is received in a power saving mode in operation S1405.

The washing machine 100 may identify whether the operation corresponding to the control word included in the user voice is executable when the power of the washing machine 100 is off in operation S1410.

If it is identified that the operation is not executable, the washing machine 100 may switch the washing machine 100 to a power-on state, and execute an operation corresponding to the control word in operation S1415.

In operation S1410, if the operation corresponding to the control word is identified as being executable in the power-off state, the washing machine 100 may execute an operation corresponding to the control word in the standby mode.

In operation S1410, the control word may include at least one of a word associated with a state of the washing machine 100 and a word associated with a washing process recommendation, and may identify that the operation corresponding to the control word is executable in the power-off state.

The power saving mode and the standby mode may refer that the power of the washing machine 100 is off and only the power button is activated.

The power-on state may be a state in which at least one button other than the power button is activated.

In S1415, if the washing process is included in the user voice and the detailed option is included in the washing process, the washing process may proceed based on the detailed option.

The method may further include, if the washing machine 100 is switched to the power-on state according to the user voice, providing a feedback indicating that the washing machine 100 is switched to the power-on state.

The washing machine 100 may include the upper washing machine 100 and the lower washing machine 100, and in operation S1415, a device to execute an operation corresponding to the control word of the upper washing machine 100 and the lower washing machine 100 may be identified based on the identification information of the washing machine 100 included in the user voice.

The washing machine 100 may also include the upper washing machine 100 and the lower washing machine 100, and if the identification information of the washing machine 100 is not included in the user voice, both the upper washing machine 100 and the lower washing machine 100 may be switched to a power-on state.

The washing machine 100 may include the upper washing machine 100 and the lower washing machine 100, and operation in S1415 may include, if the user voice does not include the identification information of the washing machine 100, switching the lower washing machine 100 to a power-on state, and executing an operation corresponding to the control word in the lower washing machine 100.

Figure 15:
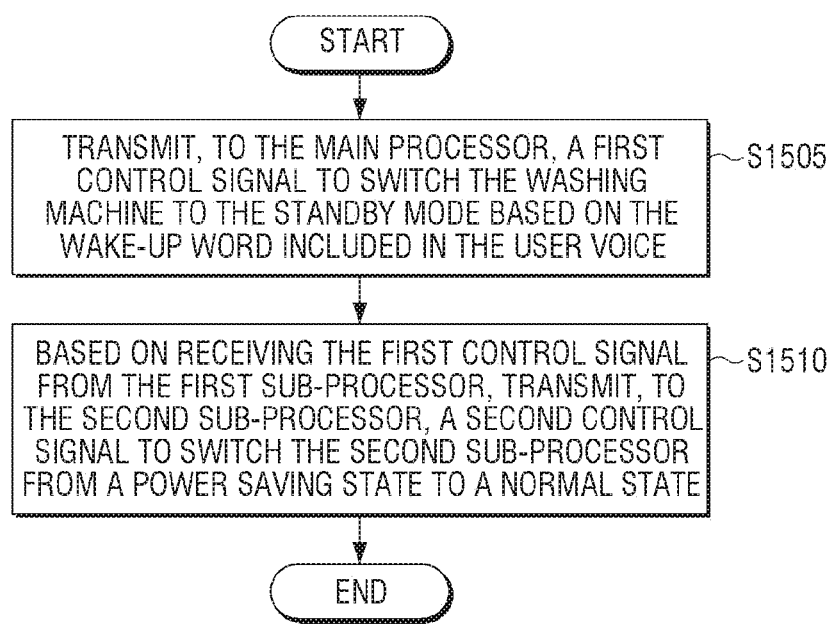
FIG. 15 is a flowchart illustrating a control method of a washing machine according to another embodiment.

FIG. 15 is a flowchart illustrating a control method of a washing machine according to another embodiment.

Referring to FIG. 15, in the control method of the washing machine 100 according to an embodiment, the washing machine 100 includes the voice inputter 101, the display 102, the main processor 121, and the first sub-processor 122 which operates in a normal state in the power saving mode of the washing machine 100 and performs a voice recognition for the user voice received through the voice inputter 101 and the second sub-processor 123 which controls the display 102 and operates in a power saving state in the power saving mode. The control method includes transmitting a first control signal for switching the washing machine 100 to the standby mode based on a wake-up word included in the user voice by the first sub-processor 122 to the main processor 121 in operation S1505 and transmitting, by the main processor 121, based on receiving the first control signal from the first sub-processor 122, a second control signal to switch the second sub-processor 123 to the normal state in the power saving state to the second sub-processor 123 in operation S1510.

The main processor 121 operates with a power saving state in a power saving mode, and the control method may further include switching the power saving state to a normal state when the main processor 121 receives the first control signal from the first sub-processor 122 and switching the washing machine 100 to the standby mode.

If the data corresponding to the user voice is received, identifying whether the operation corresponding to the control word included in the data is executable by the main processor 121 while the power of the washing machine 100 is turned off, and if the operation is identified as being executable in the power-off state, executing an operation corresponding to the control word in the standby mode by the main processor 121 may be further included.

If it is identified that the operation is not executable in the power-off state, the method may further include switching by the main processor 121 the washing machine 100 to the power-on state and executing an operation corresponding to the control word.

The main processor 121 and the second sub-processor 123 may be connected via the first data communication line and the first power control line, the first sub-processor 122 and the second sub-processor 123 may be connected via the second data communication line, the main processor 121 and the first sub-processor 122 may be connected via the second power control line, and the control signal for switching the washing machine 100 to the standby mode may be transmitted from the first sub-processor 122 to the main processor 121 via the second power control line.

The power saving mode and the standby mode may be a state in which the power of the washing machine 100 is turned off and only a power button is activated.

The display 102 includes a manipulation input panel, and the second sub-processor 123 may switch to a normal state when the second control signal is received from the main processor 121, and activate at least one button other than the power button included in the manipulation input panel when the washing machine 100 is switched to the power-on state.

The washing machine 100 includes the upper washing machine 1105 and the lower washing machine 1110, the first sub-processor 122 is included in one of the upper washing machine 1105 and the lower washing machine 1110, and the second sub-processors 123 and 223 and the main processors 121 and 221 may be included in the upper washing machine 1105 and the lower washing machine 1110, respectively.

If the first sub-processor 122 identifies whether the operation corresponding to the control word included in the user voice is executable in the turned-off state, and if the operation is identified as being executable in the power-off state, the first sub-processor 122 may further include transmitting a control signal for executing an operation corresponding to the control word to at least one of the second sub-processors 123 and 223 and the main processors 121 and 221.

If it is identified that the operation is not executable in the power-off state, the first sub-processor 122 may further include a step of transmitting a control signal for switching the washing machine 100 to a power-on state to at least one of the second sub-processors 123 and 223 and the main processors 121 and 221.

The control method of FIGS. 13 to 15 may be executed in a washing machine including the configuration of FIGS. 1 to 4, and may be executed in a washing machine including other configurations.

The control method of the washing machine 100 control method according to the embodiment described above may be implemented as a program and provided to the washing machine 100. A program comprising the control method of the washing machine 100 may be stored in a non-transitory computer readable medium.

The methods according to various embodiments as described above may be implemented as an application installable in a washing machine.

The methods according to various embodiments may be implemented only be software upgrade or hardware upgrade for the washing machine.

The various embodiments as described above may be performed through an embedded server provided in the washing machine 100 or an external server of the washing machine 100.

The controlling method of the washing machine 100 according to an embodiment may be implemented as a program and provided to the washing machine 100. In particular, a program including a controlling method of the washing machine 100 may be stored in a non-transitory computer readable medium and provided.

A non-transitory computer readable medium storing a computer instruction to enable the washing machine 100 to execute an operation when executed by the processor 120 of the washing machine 100, wherein the operation may include, based on receiving a user voice through the voice inputter 101 in the power saving mode of the washing machine 100, switching to a standby mode of the washing machine 100 based on a wake-up word included in a user voice, maintaining the standby mode of the washing machine 100 based on the control word included in the user voice or switching the washing machine 100 to the operation mode and executing an operation corresponding to the control word in the standby mode or the operation mode.

The various embodiments described above may be implemented in a recordable medium which is readable by computer or a device similar to computer using software, hardware, or the combination of software and hardware. By hardware implementation, the embodiments of the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electric units for performing other functions. In some cases, embodiments described herein may be implemented by the processor 120 itself. According to a software implementation, embodiments such as the procedures and functions described herein may be implemented with separate software modules. Each of the above-described software modules may perform one or more of the functions and operations described herein.

Meanwhile, the computer instructions for performing the processing operations in the washing machine according to the various embodiments described above may be stored in a non-transitory computer-readable medium. The computer instructions stored in this non-transitory computer-readable medium cause the above-described specific device to perform the processing operations in the electronic apparatus according to the above-described various embodiments when executed by the processor of the specific device.

The non-transitory computer readable medium refers to a medium that stores data semi-permanently rather than storing data for a very short time, such as a register, a cache, a memory or etc., and is readable by an apparatus. In detail, the aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like.

The foregoing embodiments and advantages are merely exemplary and are not to be construed as limiting the disclosure. The present teaching may be readily applied to other types of devices. Also, the description of the embodiments of the disclosure is intended to be illustrative, and not to limit the scope of the claims, and many alternatives, modifications, and variations will be apparent to those skilled in the art.

What is claimed is:

1. A washing machine comprising:
a voice inputter; and
a processor configured to:
based on receiving a user voice through the voice inputter in a power saving mode of the washing machine, switch the washing machine to a standby mode based on a wake-up word included in the user voice,
determine whether an operation corresponding to a control word included in the user voice can be executed in the standby mode,
based on receiving the user voice including a first control word, maintain the standby mode of the washing machine and execute a first operation corresponding to the first control word in the standby mode, and
based on receiving the user voice including a second control word, switch the washing machine to an operation mode and execute a second operation corresponding to the second control word in the operation mode,
wherein the power saving mode is a mode for supplying power to the processor that controls the voice inputter, and not processing information corresponding to the control word,
wherein the standby mode is a mode for processing information corresponding to the control word and controlling a motor, for performing a cleaning process, to be inactivated, and
wherein the operation mode is a mode for controlling the motor, for performing the cleaning process, to be activated,
wherein the power saving mode and the standby mode are modes in which only a power button, among at least one button provided in the washing machine, is activated, and
wherein the operation mode is a mode in which at least one button other than the power button is activated.

2. The washing machine of claim 1, wherein the processor is further configured to:
identify whether an operation corresponding to the control word is executable in the standby mode, and based on the operation being identified as executable in the standby mode, execute an operation corresponding to the control word in the standby mode, and
based on the operation being identified as non-executable in the standby mode, switch the washing machine to the operation mode and execute an operation corresponding to the control word.

3. The washing machine of claim 2, wherein the processor is further configured to, based on the control word including at least one of a word associated with a state of the washing machine and a word associated with a washing process recommendation, identify an operation corresponding to the control word as being executable in the standby mode.

4. The washing machine of claim 1, wherein the processor is further configured to, based on a word associated with a washing process and a word associated with a detailed option of the washing process being included in the user voice, switch the standby mode to the operation mode, and proceed the washing process based on the detailed option.

5. The washing machine of claim 1,
wherein the processor comprises a main processor and a first sub-processor,
wherein the first sub-processor is further configured to:
 operate in a normal state in the power saving mode, execute voice recognition for the user voice, and
 transmit, to the main processor, a first control signal to switch the washing machine to the standby mode based on a wake-up word included in the user voice, and
wherein the main processor is further configured to, based on receiving the first control signal from the first sub-processor, switch the washing machine to the standby mode.

6. The washing machine of claim 5, wherein the main processor is further configured to:
operate with a power saving state in the power saving mode, and
based on receiving the first control signal from the first sub-processor, switch the power saving state of the main processor to a normal state to switch the washing machine to a standby mode.

7. The washing machine of claim 5,
wherein the processor further comprises:
 a second sub-processor configured to control a display and operate with a power saving state in the power saving mode, and
wherein the main processor is further configured to:
 based on receiving the first control signal from the first sub-processor, transmit, to the second sub-processor, a second control signal to switch the second sub-processor from the power saving state to a normal state.

8. The washing machine of claim 7,
wherein the main processor and the second sub-processor are connected through a first data communication line and a first power control line,
wherein the first sub-processor and the second sub-processor are connected through a second data communication line,
wherein the main processor and the first sub-processor are connected through a second power control line, and
wherein a control signal to switch the washing machine to a standby mode is transmitted from the first sub-processor to the main processor through the second power control line.

9. The washing machine of claim 7,
wherein the display comprises a manipulation input panel, and
wherein the second sub-processor is further configured to:
 based on receiving the second control signal from the main processor, switch to the normal state, and
 based on the washing machine switching to the operation mode, activate at least one button other than a power button included in the manipulation input panel.

10. The washing machine of claim 7,
wherein the washing machine comprises an upper washing machine and a lower washing machine,
wherein the first sub-processor is included in at least one of the upper washing machine and the lower washing machine, and
wherein the second sub-processor and the main processor are included in both of the upper washing machine and the lower washing machine, respectively.

11. The washing machine of claim 7, wherein the first sub-processor is further configured to:
based on the operation being determined as executable in the standby mode, transmit a control signal to execute the operation corresponding to the control word to at least one of the second sub-processor or the main processor, and
based on the operation being determined as not executable in the standby mode, transmit a control signal to switch the washing machine to the operation mode to at least one of the second sub-processor or the main processor.

12. The washing machine of claim 1,
wherein the washing machine comprises an upper washing machine and a lower washing machine, and
wherein the processor is further configured to identify at least one of the upper washing machine and the lower washing machine to execute the operation corresponding to the control word based on identification information of the washing machine included in the user voice.

13. The washing machine of claim 1,
wherein the washing machine comprises an upper washing machine and a lower washing machine, and
wherein the processor is further configured to:
 based on identification information of the washing machine not being included in the user voice, switch both of the upper washing machine and the lower washing machine to the standby mode or the operation mode, or switch the lower washing machine to the standby mode or the operation mode.

14. A control method of a washing machine, the method comprising:
based on receiving a user voice through a voice inputter in a power saving mode of a washing machine, switching to a standby mode of the washing machine based on a wake-up word included in the user voice;
determining whether an operation corresponding to a control word included in the user voice can be executed in the standby mode;
receiving a first user voice including a first control word, maintaining the standby mode of the washing machine and executing a first operation corresponding to the first control word in the standby mode; and
receiving a second user voice, at a time after receiving the first user voice, including a second control word, switching the washing machine to an operation mode and executing a second operation corresponding to the second control word in the operation mode,
wherein the power saving mode is a mode for supplying power to a processor that controls the voice inputter and not processing information corresponding to the control word,
wherein the standby mode is a mode for processing information corresponding to the control word and controlling a motor, for performing a cleaning process, to be inactivated, and
wherein the operation mode is a mode for controlling the motor, for performing the cleaning process, to be activated,
wherein the power saving mode and the standby mode are modes in which only a power button, among at least one button provided in the washing machine, is activated, and
wherein the operation mode is a mode in which at least one button other than the power button is activated.

* * * * *